(12) United States Patent
Bunting et al.

(10) Patent No.: US 12,306,458 B2
(45) Date of Patent: May 20, 2025

(54) ACTUATION APPARATUS

(71) Applicant: CAMBRIDGE MECHATRONICS LIMITED, Cambridge (GB)

(72) Inventors: Stephen Matthew Bunting, Cambridge (GB); Oliver Hart, Cambridge (GB); David Ooi, Cambridge (GB); Peter Van Wyk, Cambridge (GB); Joshua Carr, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 248 days.

(21) Appl. No.: 17/789,094

(22) PCT Filed: Dec. 21, 2020

(86) PCT No.: PCT/GB2020/053336
§ 371 (c)(1),
(2) Date: Jun. 24, 2022

(87) PCT Pub. No.: WO2021/130481
PCT Pub. Date: Jul. 1, 2021

(65) Prior Publication Data
US 2023/0032266 A1 Feb. 2, 2023

(30) Foreign Application Priority Data
Dec. 26, 2019 (GB) ..................... 1919339

(51) Int. Cl.
*G02B 7/08* (2021.01)
*F03G 7/06* (2006.01)

(52) U.S. Cl.
CPC ........... *G02B 7/08* (2013.01); *F03G 7/06143* (2021.08); *F03G 7/064* (2021.08)

(58) Field of Classification Search
None
See application file for complete search history.

(56) References Cited

U.S. PATENT DOCUMENTS

| 8,588,598 B2 * | 11/2013 | Topliss ..................... G03B 3/10 396/73 |
| 2010/0060778 A1 * | 3/2010 | Tsuchiya ................ H04N 23/57 348/340 |

(Continued)

FOREIGN PATENT DOCUMENTS

| CN | 101846785 A | 9/2010 |
| CN | 102023364 A | 4/2011 |

(Continued)

OTHER PUBLICATIONS

English Translation JP-2005114776-A (Year: 2005).*

(Continued)

*Primary Examiner* — Shafiq Mian
(74) *Attorney, Agent, or Firm* — Van Hoven PC; Stefan D. Osterbur; Joshua Van Hoven

(57) ABSTRACT

An actuation apparatus comprising: a support structure; a movable element; a helical bearing arrangement supporting the movable element on the support structure and arranged to guide helical movement of the movable element with respect to the support structure along a helical path around a helical axis; an actuating mechanism configured to drive rotation of the movable element around the helical axis which the helical bearing arrangement converts into said helical movement; and a loading arrangement configured to exert a biasing force on the movable element in a direction that is at least substantially normal to the helical path over an operating range of the helical movement.

21 Claims, 11 Drawing Sheets

(56) References Cited

U.S. PATENT DOCUMENTS

2011/0179786 A1\* 7/2011 Topliss ................... F03G 7/065
                                                                   60/527
2015/0200612 A1\* 7/2015 Matsukawa ........ H10N 30/2023
                                                             310/323.01

FOREIGN PATENT DOCUMENTS

| | | | |
|---|---|---|---|
| CN | 109975972 A | | 7/2019 |
| CN | 110031947 A | | 7/2019 |
| CN | 112292528 A | | 1/2021 |
| CN | 113272702 A | | 8/2021 |
| EP | 3 452 837 | | 3/2019 |
| EP | 3 452 873 A1 | | 3/2019 |
| JP | H01128209 U | | 9/1989 |
| JP | 2005083291 | | 3/2005 |
| JP | 2005-114776 | | 4/2005 |
| JP | 2005114776 A | \* | 4/2005 |
| JP | 2006-038931 | | 2/2006 |
| KR | 20190114588 A | | 10/2019 |
| WO | WO 2019243849 | | 12/2019 |

OTHER PUBLICATIONS

GB Search Report and Examination Report dated Aug. 26, 2020 of GB Application 1919339.0.
International Search Report and Written Opinion of PCT/GB2020/053336 dated Jun. 8, 2021.
Office action of CN Application 202080090791.5 dated Jan. 24, 2025 (Machine translation).

\* cited by examiner

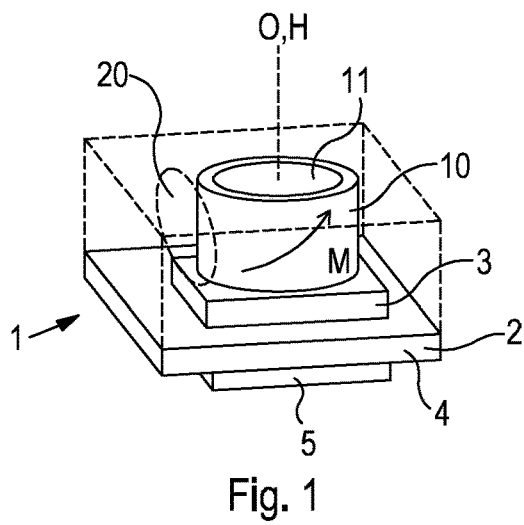
Fig. 1
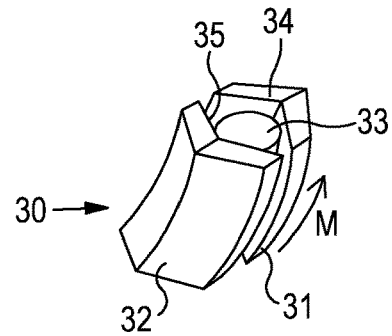
Fig. 2
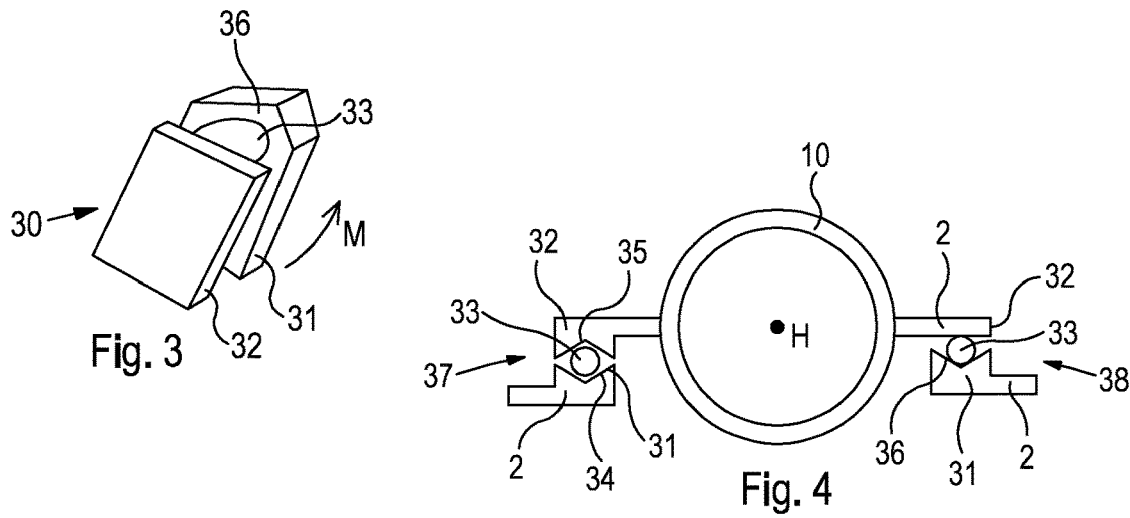
Fig. 3
Fig. 4
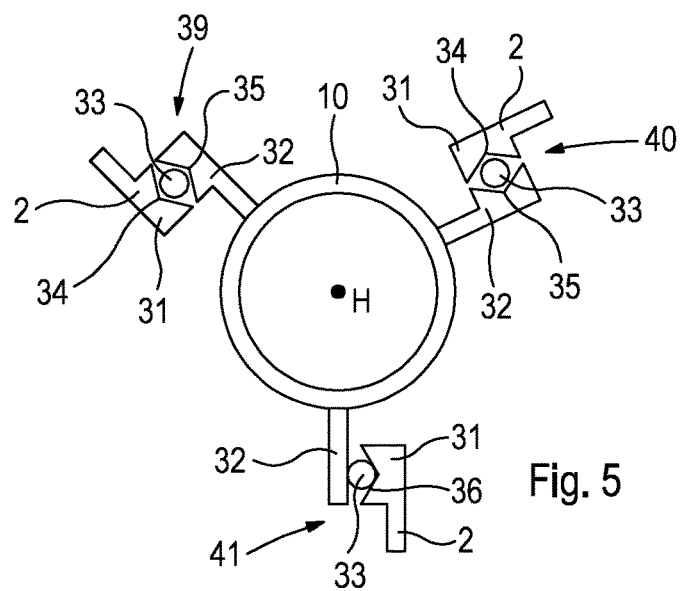
Fig. 5

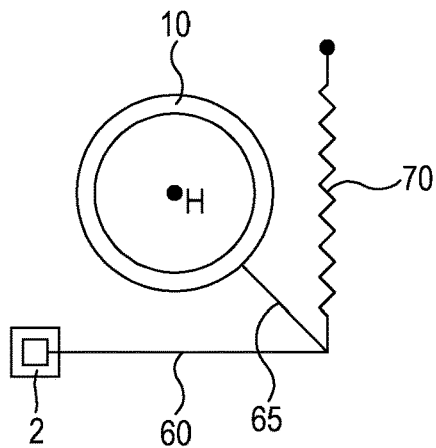
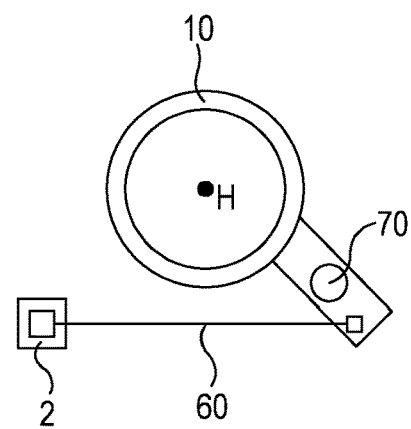
Fig. 25  Fig. 26
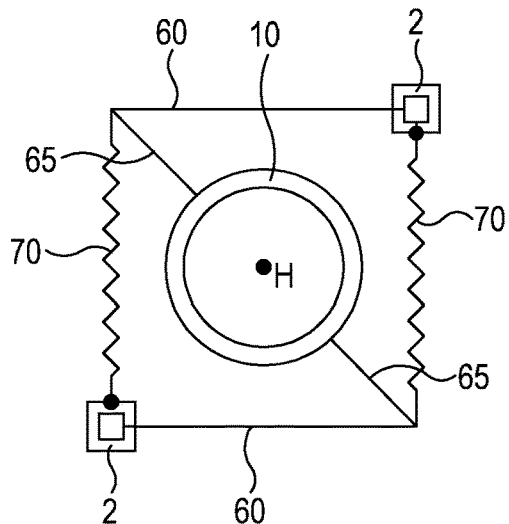
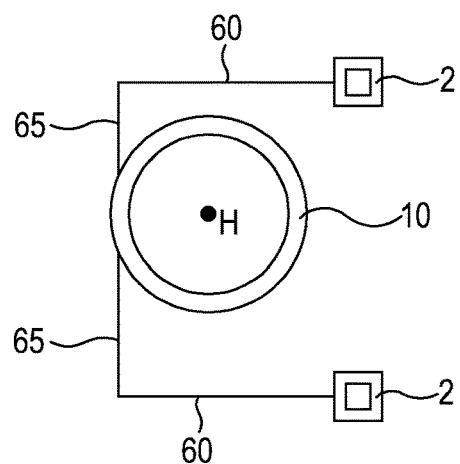
Fig. 27  Fig. 28
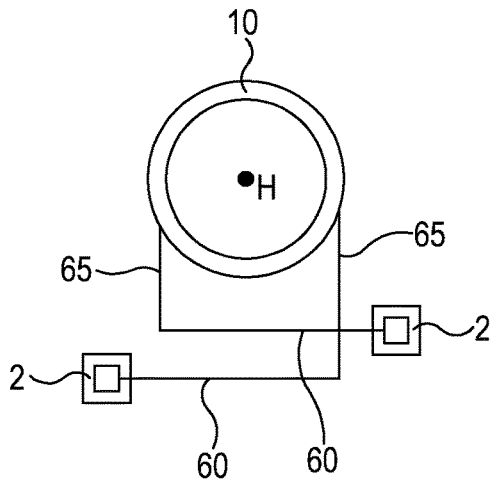
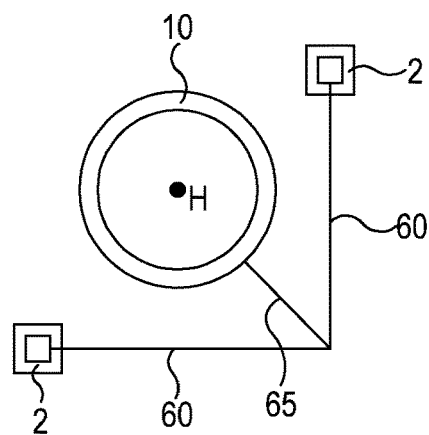
Fig. 29  Fig. 30

ACTUATION APPARATUS

CROSS-REFERENCE TO RELATED APPLICATIONS

This application is a national stage application under 35 U.S.C. § 371 of International Application No. PCT/GB2020/053336, filed Dec. 21, 2020, which claims priority of GB Patent Application No. 1919339.0, filed Dec. 26, 2019, the disclosures of each of which are hereby incorporated by reference herein in their entireties.

FIELD

The present disclosure relates to an actuation apparatus in an actuating mechanism that drives movement of a movable element with respect to a support structure.

BACKGROUND

It is known to use an actuator to drive translational movement of a movable element with respect to a support structure, in particular a voice coil motor (VCM) or shape memory alloy (SMA) actuator. SMA actuator wires have particular advantages in miniature devices and may be applied in a variety of devices including handheld devices, such as cameras and mobile phones. Such SMA actuator wires may be used for example in an optical device such as a camera for driving translational movement of a camera lens element along its optical axis, for example to effect focussing (autofocus, AF) or zoom.

Some examples of actuation apparatuses which are cameras of this type are disclosed in WO-2007/113478. Herein, the movable element is a camera lens element supported on a support structure by a helical bearing arrangement comprising flexures that guide translational movement along the optical axis. In one example described herein, the SMA actuator wire is a piece of SMA wire connected at its ends to a support structure and hooked over a hook on a camera lens element for driving the translational movement. The straight SMA actuator wires formed by the portions of the piece of SMA wire on either side of the hook extend at an acute angle of greater than 0 degrees to the movement direction parallel to the optical axis. Angling the SMA actuator wires in this way increases the amount of movement compared to an SMA actuator wire extending along the movement direction and also reduces the extent of the actuator in the movement direction.

Miniaturisation is an important design criteria in many types of actuation apparatus. In many applications, it is desirable to minimise the size of the actuation apparatus in the movement direction. For example, where the actuation apparatus comprises a lens element that is moved along the optical axis, it is desirable to minimise the size along the optical axis.

In an actuation apparatus in which SMA actuator wires extend at an acute angle to the movement direction, as in the camera disclosed in WO-2007/113478 for example, the SMA actuator wires themselves necessarily have an extent projected along the movement direction. This places a minimum size on the actuation apparatus along the movement direction, even if other components may be made smaller in that direction. In particular, the extent of the SMA actuator wires projected along the movement direction is determined by the required degree of translational movement required, because the maximum change in length of the SMA actuator wires is a given percentage of the overall length of the SMA actuator wires, this resulting from the electromechanical properties of the SMA material.

SUMMARY

According to a first aspect of the present disclosure, there is provided an actuation apparatus comprising: a support structure; a movable element; a helical bearing arrangement supporting the movable element on the support structure and arranged to guide helical movement of the movable element with respect to the support structure along a helical path around a helical axis; an actuating mechanism configured to drive rotation of the movable element around the helical axis which the helical bearing arrangement converts into said helical movement; and a resilient loading arrangement comprising a resilient element connected between the movable element and the support structure, the resilient element configured to exert a biasing force on the movable element in a direction that is at least substantially normal to the helical path over an operating range of the helical movement.

The actuating mechanism may comprise any suitable actuator including, for example, a voice coil motor (VCM) or piezoelectric elements. Such actuators may be capable of driving the rotation of the movable element around the helical axis which the helical bearing arrangement converts into said helical movement.

Alternatively or in addition, the actuating mechanism may comprise at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

This type of actuation apparatus makes use of a helical bearing arrangement which guides helical movement of the movable element with respect to the support structure. Such helical movement involves rotation around a helical axis together with an overall translation along the helical axis. Thus, the SMA actuator wire is connected between the support structure and the movable element so as to drive rotation of the movable element around the helical axis. The rotation driven by contraction of the SMA actuator wire is converted by the helical bearing arrangement into helical movement of the movable element. Thus, translational movement of the movable element is achieved along the helical axis as part of the helical movement.

As the SMA actuator wire has the primary purpose of driving rotation, the extent of the SMA actuator wire projected along the helical axis may be minimised, such that some other component of the actuation apparatus determines the size of the actuator in the direction of the helical axis along which translational movement is achieved.

The actuating mechanism (e.g. the at least one shape memory alloy actuator wire) may be arranged to drive rotation of the movable element around the helical axis by less than a quarter of a full turn, or preferably less than 10°, or preferably less than 5° or preferably less than 2.5°. This may correspond to the abovedescribed operating range. The actuating mechanism may be arranged to drive rotation of the movable element around the helical axis by more than 0.1°, preferably more than 0.5°, more preferably more than 1°.

As described above, the resilient element is connected between the movable element and the support structure. The resilient element may be fixedly connected and extend between the movable element and the support structure. In particular, the resilient loading arrangement need not comprise any bearing elements such as rolling or sliding bearing elements.

This may help to reduce the cost and complexity of the actuator and/or of its manufacture.

Advantageously, the resilient loading arrangement may not interfere nor require changing the profile of the bearing surfaces. Furthermore, it may advantageously allow the biasing force to be evenly distributed over the bearing surface, e.g. over a plain bearing or over plural rolling bearings.

As described above, the resilient element exerts a biasing force on the movable element in a direction that is at least substantially normal to a helical path along which the movable element moves. As will be appreciated, the direction of such a helical path varies along its length and, in particular, varies as a function of the angle around the helical axis. That the biasing force is normal to the helical path may mean, for example, that the biasing force is perpendicular to the helical path at a point along the helical path that is at the same angle around the helical axis as the (equivalent) point of application of the biasing force.

The helical bearing arrangement may include bearing surfaces on the support structure and/or on the movable element that are aligned with the helical path so as to guide the helical movement of the moveable element. Hence the above-described biasing force may produce a positive reaction force that is normal to one or more of these bearing surfaces (or, where a bearing surface is made up of two faces, produce at least substantially equal reaction forces on each of the two faces).

When the biasing force is applied in a direction that is normal to bearing surfaces, it does not directly act against the helical movement of the moveable element along the bearing surfaces, thus minimising resistance to motion and therefore improving the efficiency.

However, the biasing force may also be exerted in a direction that is within a range of angles from the above-described normal. In particular, the biasing force may be at an angle of less than 20°, or preferably less than 10°, or preferably less than 5° from the normal.

Moreover, the direction and/or magnitude of the biasing force is preferably at least substantially constant (e.g. to within 10%) over the operating range of the helical movement. Thus, the behaviour of the helical bearing arrangement will be substantially constant over the operating range of the helical movement, aiding performance (e.g. controllability) of the actuation apparatus 1.

The resilient loading arrangement may be provided adjacent to at least one of the plural bearing surfaces, the said at least one of the plural bearing surfaces may be provided with bearing elements, or it may be free of bearing elements. For example, the resilient element may be provided on or adjacent to only one of the plural bearing surfaces at each of the moveable element and the support structure. For example, by applying the biasing force on a single bearing surface, the biasing force may be sufficient to transfer to all of the other bearing surfaces. In some embodiments, the resilient element may be provided on or adjacent to some or all plural bearing surfaces at each of the moveable element and the support structure. For example, by applying the biasing force on a single bearing surface, the biasing force may be sufficiently transfer to all of the other bearing surfaces.

The separation may be a gap that substantially equals the height of the bearing elements, as such the bearing elements are constantly in contact with the bearing surfaces. The separation may include a zero value, in which the bearing surfaces may be in contact with each other. For example, the bearing element may be a plain bearing, or there may be an absence of bearing elements between the bearing surfaces.

Advantageously, embodiments of the present invention may allow a biasing force to be exerted throughout the range of rotational movement or when the actuator apparatus (in particular, e.g. the SMA actuator wire) is in an unpowered state.

Optionally, the helical bearing arrangement comprises one or more of: at least one rolling bearing, plain bearing and liquid bearing disposed between the bearing surfaces. Advantageously, such arrangement reduces the friction between the bearing surfaces. Preferably, rolling bearings such as ball bearings may be applied. The bearings may be provided on all or some of the bearing surfaces. In some embodiments, some of the plural bearing surfaces may be provided with resilient loading arrangement and ball bearings. In some embodiments, one of the plural bearing surfaces may be provided with resilient loading arrangement in absence of ball bearings.

Optionally, the said biasing force is exerted throughout a full range of helical movement. This may allow the bearing surfaces to be in constant contact with each other, or with the bearing element therebetween. Advantageously, by maintaining a constant separation between the movable element and the support structure throughout the range of movement, such arrangement may reduce jitter, as well as improving the precision of movable element as it moves along the optical axis.

Optionally, the said biasing force is exerted when the actuating mechanism (e.g. the SMA wires) is not energised. More specifically, the biasing force may allow the relative position (and/or separation) of the movable element and the support structure to be maintained. Advantageously, this may allow the movable element to be kept in place e.g. to enable certain camera functionality, including when the device is turned off, e.g. to minimise risk of damage during transportation. Preferably, this applies for any orientation of the actuating mechanism.

Optionally, the resilient element is configured to, e.g. through recovery from bending or resistance to bending, exert a biasing force directly on the movable element and/or the support structure. Advantageously, such arrangement may allow a minimal biasing force to be exerted at one end of rotational movement, e.g. when the actuation apparatus is powered off. At this position the biasing force may only arise from reaction to movement of the moveable part. Furthermore, the use of a resilient elements such as a simple flexure not only reduces weight and prolongs reliability, in some designs it may advantageously allow the flexure to be attached to an external surface of the moveable element and the support structure. Thus, such arrangement may simplify and streamline the manufacturing process. Additionally, the use of a flexure may allow a bi-directional force to be applied in opposing directions.

Optionally, the resilient element comprises a flexure attached to one or both of the support structure and the movable element. For example, the flexure may bridge across the two parts. The resilient element may attach to both of the support structures and the movable element, wherein the resilient element may deform along the rotational direction around the helical axis. The resilient element may attach to one of the support structures and the movable element such that advantageously it may move or rotate freely to the other of the of the support structure and the movable element.

Optionally, the flexure comprises a first portion and second portion respectively connected to the support structure and the moveable element. Optionally, the first portion and the second portion are connected by an intermediate portion, wherein the biasing force is effected by recovery from bending or resistance to bending in the intermediate portion. More specifically, the intermediate portion may be a performed or jogged section for exerting the biasing force. In this embodiment, the biasing force may arise from resistance in bending the jogged portion or recovery from a bending in the jogged section. Advantageously, such arrangement may prevent bending in the first portion and/or the second portion, thereby permitting a larger contact area between the flexure and the movable part and/or the support structure.

Optionally, the resilient element is attached to the support structure or the moveable element by a clamp at the first portion, or the second portion, or between the first position and the second position of the flexure. Optionally, the flexure is a planar flexure extending substantially orthogonal to the helical axis. For example, the flexure may be in a planar form, or at least complies with a part of a surface profile of the moveable element and/or support structure. Advantageously such arrangement may allow the resilient element to be attached to the movable element and/or the support structure after the two parts are assembled. In some embodiment, the clamp may comprise an adjustable clamp which may advantageously allow the biasing force to be adjustable. Optionally, the clamp may be a cantilever connected between the first portion and the second portion. The connection between the flexure and the tip of the cantilever may be affected by interference fit or any other suitable mechanisms. More specifically, the flexure may be suspended on the cantilever prior to loading. Advantageously, such arrangement may allow the flexure to be assembled or replaced efficiently.

Optionally, the flexure is configured to extend around the helical axis. For example, the flexure may be a circlip or a circular or spiral spring wound around the helical axis. Optionally, the flexure comprises an etched spring flexure. For example, the etched spring flexure may provide as a compacted arrangement in comparison to the circlip. Such arrangement allows the moveable element and the support structure to be biases towards each other in a direction normal to at least one bearing surfaces. Generally, a longer flexure is advantageous as it applies a relatively low force per unit length and so is less sensitive to e.g. positional tolerances during assembly and may also apply a force in way that is less affected by the movement of the movable element.

Optionally, the resilient element may be an elastic member, e.g. an elastic band, connected between external surfaces of movable element and the support structure. Advantageously, such an arrangement (or an arrangement with an etched spring, coiled spring or other type of spring element in place of the elastic member) may allow the resilient member to be attached to the movable element and the support structure once they are assembled with each other.

Optionally, the resilient element comprises plural opposing resilient elements and the biasing force comprises a bi-directional biasing force opposite to each other. Optionally, the biasing force exerted by each of the opposing resilient elements may substantially be equal. Thus, the biasing force exerted by each of the resilient elements may balance out each other. For example, the resilient element may comprise opposing flexures positioned onto external surfaces of movable element and the support structure. Alternatively, a pair of oppositely arranged elastic bands may each have one end connected to the respective movable element and the support structure whilst the other end connected to the movable element. Advantageously, such arrangement may allow a bi-directional biasing force to be applied and therefore the separation between the bearing surfaces may be accurately maintained.

According to a second aspect of the present disclosure, there is provided an actuation apparatus comprising: a support structure; a movable element; a helical bearing arrangement supporting the movable element on the support structure by respective bearing surfaces and arranged to guide helical movement of the movable element with respect to the support structure around a helical axis; a resilient loading arrangement disposed between the bearing surfaces of the support structure and the moveable element, the resilient loading arrangement is configured to exert a biasing force on the movable element and/or the support structure in a direction normal to at least one of the bearing surfaces, so as to maintain a separation between the bearing surfaces of the support structure and the movable element.

Advantageously, such arrangement allows the biasing force to act directly and normally against the bearing surfaces, therefore advantageously the force may be applied more efficiently at the bearing surfaces, as well as minimising the likelihood of separation and/or slippage thereat.

Optionally, the resilient loading arrangement is contained between the bearing surfaces of the support structure and the movable element. Advantageously, this may allow the resilient locating arrangement to be hidden and shielded between the bearing surfaces, as well as resulting in a more compact actuation apparatus.

Optionally, wherein the resilient loading arrangement comprises a resilient element configured to exert the biasing force against a bearing element disposed in between the bearing surfaces, wherein the resilient loading arrangement is configured to exert the biasing force against one or both of the bearing surfaces by the bearing element. The resilient element may be configured to exert the biasing force in a direction substantially normal to the bearing surfaces. Optionally, the resilient element may be a flexure or a coil spring for compressing a bearing element against the respective bearing surface. That is, the resilient loading arrangement may be applied together, or in lieu of, ball bearings. In some embodiment, a corresponding groove may be provided on the bearing surface to receive at least a portion of the bearing element, so as to guide the movement of the bearing element.

According to a third aspect of the present invention, there is provided an actuation apparatus comprising: a support structure; a movable element; a helical bearing arrangement supporting the movable element on the support structure by respective bearing surfaces, the helical bearing arraignment is arranged to guide helical movement of the movable element with respect to the support structure around a helical axis, wherein the bearing surfaces of the support structure and the moveable element are angled to each other to form a narrowing gap therebetween; an actuating mechanism configured to drive rotation of the movable element around the helical axis which the helical bearing arrangement converts into said helical movement; and a resilient loading arrangement comprises a resilient element configured to exert a biasing force in a direction towards the narrow end of the gap and on the angled bearing surfaces, so as to maintain a separation between angled bearing surfaces. Optionally, the resilient loading arrangement comprises a ball bearing biased, by the resilient element, towards the narrow end of the gap, wherein the ball bearing is configured to convert the biasing force into a direction substantially normal to one or both the bearing surfaces.

Advantageously, such arrangement may allow the bearing surfaces to slide with respect to each other, which may provide a degree of play between the moveable element and the support structure, and may be useful for some application.

Optionally, the movable element is a lens element comprising at least one lens, and wherein the helical axis is the optical axis of the lens element, and wherein the support structure has an image sensor mounted thereon, the lens element being arranged to focus an image on the image sensor. The lens element may have a diameter of at most 30 mm, or at most 20 mm, or at most 10 mm.

Optionally, the movable element comprises a haptic interface or a member connected to a haptic interface, and wherein the helical axis is an axis of haptic movement, as such the moveable element may actuate along the helical axis to effect haptic response at the haptic interface. Advantageously, such arrangement allows a longer length of the SMA to be applied and as such improves haptic performance.

Optionally, the actuating mechanism is configured to apply, upon activation, a driving force for driving relative rotation between the moveable element and the support structure, wherein such driving force is sufficient to overcome the biasing force. Optionally, the biasing force exerted by the resilient element is insufficient to cause relative rotation between the moveable element and the support structure. For example, the biasing force should preferably be only sufficient to maintain the separation between the movable element and the support structure but it does not present great resistance to the helical movement.

According to a fourth aspect of the present disclosure, there is provided a method of assembling the actuation apparatus according to any one of the first to third aspects, the method comprising the step of: attaching the resilient element one of the movable elements and the support structure; and assembling the movable element with the support structure before or after the said attaching, wherein the resilient element is configured to apply a biasing force on the other of the movable elements and the support structure in the assembled actuation apparatus.

The actuating apparatus according to any one of the first to third aspects may optionally comprise an SMA actuator wire extending in a plane normal to the helical axis. In that case, the SMA actuator wire has a minimum extent projected along the helical axis.

Optionally, the SMA actuator wire may extend at an acute angle to a plane normal to the helical axis. In that case, the SMA actuator wire has an extent projected along the helical axis, but this may be controlled by adjusting the acute angle to fit within the size constraint of some other component of the actuation apparatus.

Various different types of helical bearing arrangement may be used to guide the helical movement of the movable element with respect to the support structure. For example, the helical bearing arrangement may comprise at least one rolling or sliding bearing, or may comprise at least one flexure extending between the support structure and the movable element.

Similarly, various different configurations for the SMA actuator wires may be used to drive rotation of the movable element around the helical axis. For example, there may be a single SMA actuator wire or plural SMA actuator wires disposed at any positions around the helical axis.

In a first type of embodiment, a resilient biasing element may be connected between the support structure and the movable element and arranged to resiliently bias the at least one SMA actuator wire. In general terms, use of a resilient biasing element with an SMA actuator wire is known, the resilient biasing element applying a stress to the SMA actuator wire and driving movement in the opposite direction from contraction of the SMA actuator wire. Such a resilient biasing element may be employed with a single SMA actuator wire or plural SMA actuator wires.

In a second type of embodiment, a pair of SMA actuator wires may be arranged, on contraction, to drive rotation of the movable element in opposite senses around the helical axis. Whereas use of a pair of SMA actuator wires that apply opposed forces to an element in translation is known in general terms, here the SMA actuator wires apply opposed torques around the helical axis. However, in a similar manner to known uses of opposed SMA actuator wires, the SMA actuator wires apply a stress to each other and, on contraction, drive rotation of the lens element in the opposite directions around the helical axis.

Particular advantage is achieved when applied to an actuation apparatus in which the movable element is a lens element comprising at least one lens, for example where the helical axis is the optical axis of the lens element. There are many applications where it is desirable to minimise the size along the direction of translational movement of such a lens element. For example, the actuation apparatus may be a camera wherein the support structure has an image sensor mounted thereon and the lens element is arranged to focus an image on the image sensor. The advantages of size reduction achieved by the present techniques are particularly valuable in a handheld device where space is at a premium and in a miniature device, for example wherein the at least one lens has a diameter of at most 30 mm, preferably at most 20 mm, preferably at most 15 mm, preferably at most 10 mm.

However, the present techniques may in general be applied to any type of device that comprises a static part and a moveable part which is moveable with respect to the static part. By way of non-limitative example, the actuator assembly may be, or may be provided in, any one of the following devices: a smartphone, a camera, a foldable smartphone, a foldable smartphone camera, a foldable consumer electronics device, an image capture device, a foldable image capture device, an array camera, a 3D sensing device or system, a servomotor, a consumer electronic device (including domestic appliances), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), a security system, a gaming system, a gaming accessory (e.g. controller, headset, a wearable controller, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle. It will be understood that this is a non-exhaustive list of example devices.

Actuator assemblies as described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

According to a fifth aspect of the present disclosure, there is provided an actuation apparatus comprising: a support structure; a movable element; a helical bearing arrangement supporting the movable element on the support structure and arranged to guide helical movement of the movable element with respect to the support structure along a helical path around a helical axis; an actuating mechanism configured to drive rotation of the movable element around the helical axis which the helical bearing arrangement converts into said helical movement; and a resilient loading arrangement configured to exert a biasing force on the movable element in a direction that is at least substantially normal to the helical path over an operating range of the helical movement, wherein the resilient loading arrangement comprises a resilient element with a first end attached to one of the movable element and the support structure and a second end to which a bearing element is attached to exert a force on the other one of the movable element and the support structure.

According to a sixth aspect of the present disclosure, there is provided an actuation apparatus comprising: a support structure; a movable element; a helical bearing arrangement supporting the movable element on the support structure and arranged to guide helical movement of the movable element with respect to the support structure along a helical path around a helical axis; an actuating mechanism configured to drive rotation of the movable element around the helical axis which the helical bearing arrangement converts into said helical movement; and a resilient loading arrangement configured to exert a biasing force on the movable element in a direction that is at least substantially normal to the helical path over an operating range of the helical movement, wherein the resilient loading arrangement comprises: a tapered gap between a surface of the movable element and a surface of the support structure; a bearing element in the tapered gap and in contact with the surfaces; and a resilient element connected to one of the movable element and the support structure and configured to urge the bearing element into the tapered gap so as to urge the surfaces apart and produce the biasing force.

According to a seventh aspect of the present disclosure, there is provided an actuation apparatus comprising: a support structure; a movable element; a helical bearing arrangement supporting the movable element on the support structure and arranged to guide helical movement of the movable element with respect to the support structure along a helical path around a helical axis; an actuating mechanism configured to drive rotation of the movable element around the helical axis which the helical bearing arrangement converts into said helical movement; and a resilient loading arrangement configured to exert a biasing force on the movable element in a direction that is at least substantially normal to the helical path over an operating range of the helical movement, wherein the resilient loading arrangement comprises: a gap between a surface of the movable element and a surface of the support structure, wherein one of the surfaces comprises a region of elastic material; a bearing element in the gap and in contact with the region of elastic material and with the other one of the surfaces, wherein the elastic material is deformed by the bearing element so as to produce the biasing force.

According to another aspect of the present disclosure, there is provided an actuation apparatus comprising: a support structure; a movable element; a helical bearing arrangement supporting the movable element on the support structure and arranged to guide helical movement of the movable element with respect to the support structure along a helical path around a helical axis; an actuating mechanism configured to drive rotation of the movable element around the helical axis which the helical bearing arrangement converts into said helical movement; and a magnetic loading arrangement configured to exert a biasing force on the movable element in a direction that is at least substantially normal to the helical path over an operating range of the helical movement.

The magnetic loading arrangement may comprise a first magnetic element mounted to the movable element and a second magnetic element mounted to the support structure, wherein the first and second magnetic elements comprise surfaces that face each other. The surfaces of the first and second magnetic elements that face each other are arranged parallel to the helical movement path. The surfaces of the first and second magnetic elements that face each other are separated by a gap, wherein the extent of the gap between the surfaces remains substantially constant over the operating range of the helical movement. One of the first magnetic second magnetic elements comprises a magnet and the other of the first and second magnetic element comprises a ferrous material. The extent of one of the surfaces of the first and second magnetic elements that are facing each other is greater than the extent of the other of the surfaces of the first and second magnetic elements that are facing each other.

Thus, these aspects may provide alternative and/or advantageous ways of producing the biasing force.

According to an eighth aspect of the present disclosure, there is provided an actuation apparatus comprising: a support structure; a movable element; a helical bearing arrangement supporting the movable element on the support structure and arranged to guide helical movement of the movable element with respect to the support structure along a helical path around a helical axis; an actuating mechanism configured to drive rotation of the movable element around the helical axis which the helical bearing arrangement converts into said helical movement; and a resilient loading arrangement configured to exert a biasing force on the movable element in a direction that is at least substantially normal to the helical path over an operating range of the helical movement, wherein the helical bearing arrangement comprises three sets of bearings and the three sets of bearings and the resilient loading arrangement are at least substantially equally spaced around the helical axis.

Thus, this aspects may provide an advantageous way of arranging the components of the helical bearing arrangement and the resilient loading arrangement. As will be appreciated, such an actuation apparatus may make efficient use of a square or rectangular footprint.

Further (optional) features are specified in the dependent claims and further advantages are described below.

To allow better understanding, embodiments of the present techniques will now be described by way of non-limitative example with reference to the accompanying drawings, in which:

FIG. 1 is a schematic view of an actuation apparatus that is a camera;

FIGS. 2 and 3 are perspective views of two helical bearings;

FIGS. 4 to 7 are schematic cross-sectional views of the actuation apparatus with different possible helical bearing arrangements;

Figure 23:
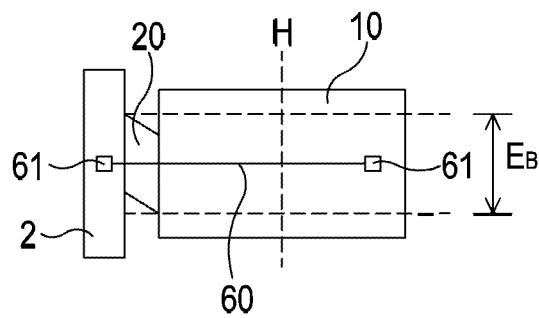
Figure 24:
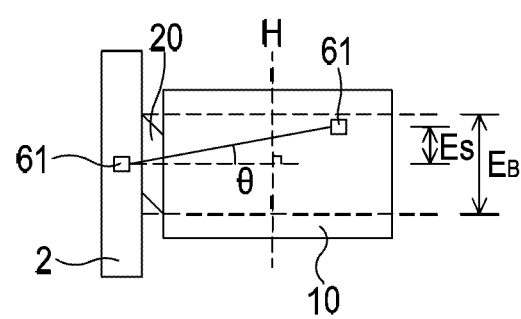

FIGS. 23 and 24 are schematic side views of the SMA actuator apparatus including an SMA actuator wire extending at two different angles; and FIGS. 25 to 27 are schematic plan views of the SMA actuator apparatus with different arrangements of SMA actuator wire and a resilient biasing element; and FIGS. 28 to 30 are schematic plan views of the SMA actuator apparatus with different arrangements of SMA actuator wire that are opposed in rotation.

Except where the context requires otherwise, the term "bearing" is used herein as follows. The term "bearing" is used herein to encompass the terms "sliding bearing", "plain bearing", "rolling bearing", "ball bearing", "roller bearing", an "air bearing" (where pressurised air floats the load) and "flexure". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. Such a rolling bearing element may be a compliant element, for example a sac filled with gas. In embodiments, the bearing may be provided on, or may comprise, non-linear bearing surfaces.

In some embodiments of the present techniques, more than one type of bearing element may be used in combination to provide the bearing functionality. Accordingly, the term "bearing" used herein includes any combination of, for example, plain bearings, ball bearings, roller bearings and flexures.

An actuation apparatus 1 that is a camera is shown schematically in FIG. 1.

The actuation apparatus 1 comprises a support structure 2 that has an image sensor 3 mounted thereon. The support structure 2 may take any suitable form, typically including a base 4 to which the image sensor is fixed. The support structure 2 may also support an IC chip 5 described further below.

The actuation apparatus 1 also comprises a lens element 10 that is the movable element in this example. The lens element 10 comprises a lens 11, although it may alternatively comprise plural lenses. The lens element 10 has an optical axis O aligned with the image sensor 3 and is arranged to focus an image on the image sensor 3.

The actuation apparatus 1 is a miniature device. In some examples of a miniature device, the lens 11 (or plural lenses, when provided) may have a diameter of at most 30 mm.

Although the actuation apparatus 1 in this example is a camera, that is not in general essential. In some examples, the actuation apparatus 1 may be an optical device in which the movable element is a lens element but there is no image sensor. In other examples, actuation apparatus 1 may be a type of apparatus that is not an optical device, and in which the movable element is not a lens element and there is no image sensor. Examples include apparatuses for depth mapping, face recognition, game consoles, projectors and security scanners.

The actuation apparatus 1 also comprises a helical bearing arrangement 20 (shown schematically in FIG. 1) that supports the lens element 10 on the support structure 2. The helical bearing arrangement 20 is arranged to guide helical movement of the lens element 10 with respect to the support structure 2 around a helical axis H. The helical axis H in this example is coincident with the optical axis O and the helical movement is shown in FIG. 1 by the arrow M. Preferably, the helical motion is along a right helix, that is a helix with constant radius, but in general any helix is possible. The pitch of the helix may be constant or vary along the helical motion. Preferably, the helical movement is generally only a small portion (less than one quarter) of a full turn of the helix.

The helical motion of the lens element 10 guided by the helical bearing arrangement 20 includes a component of translational movement along the helical axis H and rotational movement around the helical axis H. The translational movement along the helical axis H is the desired movement of the lens element 10, for example to change the focus of the image on the image sensor 3 and/or to change the magnification (zoom) of the image on the image sensor 3. The rotational movement around the helical axis H is in this example not needed for optical purposes, but is in general acceptable as rotation of the lens element 10 does not change the focus of the image on the image sensor 3.

The helical bearing arrangement 20 may take a variety of forms.

One possibility is that the helical bearing arrangement 20 comprises one or more helical bearings 30 that are rolling bearings, examples of which are shown in FIGS. 2 and 3. In each of FIGS. 2 and 3, the helical bearing 30 comprises a pair of bearing surfaces 31 and 32 and plural rolling bearing elements 33, for example balls, disposed between the bearing surfaces 31 and 32. One of the bearing surfaces 31 and 32 is provided on the support structure 2 and the other of the bearing surfaces 31 and 32 is provided on the lens element 10.

The helical bearing 30 guides the helical movement of the lens element 10 with respect to the support structure 2 as shown by the arrow M. This may be achieved by the bearing surfaces 31 and 32 extending helically around the helical axis H, that is following a line that is helical. That said, in practical embodiments, the length of the bearing surfaces 31 and 32 may be short compared to the distance of the bearing surfaces 31 and 32 from the helical axis H, such that their shape is close to straight or even each being straight, provided that the one or more helical bearings of the helical bearing arrangement 20 guide helical movement of the lens element 10 with respect to the support structure 2. Plural helical bearings 30 are typically present, located at different angular positions around the helical axis H, in which case the helical bearings 30 have different orientations so that they cooperate and maintain adequate constraints to guide the helical movement of the lens element 10 with respect to the support structure 2, even if the bearing surfaces 31 and 32 of an individual helical bearing 30 are straight.

In the example of FIG. 2, the bearing surfaces 31 and 32 each comprise respective grooves 34 and 35 in which the rolling bearing elements 33 are seated. In this example, the grooves 34 and 35 constrain transverse translational movement of the lens element 10 with respect to the support structure 2, that is transverse to the direction of movement shown by arrow M. The grooves shown in FIG. 2 are V-shaped in cross-section, but other cross-sections are possible, for example curved as in portions of a circle or an oval. In general, the grooves 34 and 35 provide two points of contact with the respective rolling bearing elements 33. The grooves 34 and 35 may extend helically. Alternatively, in practical embodiments, the length of the bearing surfaces 31 and 32 may be short compared to the distance of the bearing surfaces 31 and 32 from the helical axis H, in which case the grooves 34 and 35 may be straight or close to straight, provided that the one or more helical bearings 30 of the helical bearing arrangement 20 guide helical movement of the lens element 10 with respect to the support structure 2.

In the example of FIG. 3, a first bearing surface 31 comprises a groove 36 in which the rolling bearing elements 33 are seated and a second bearing surface 32 wherein the bearing surface is 'planar'. The first bearing surface 31 comprising a groove 36 may be provided on either one of the support structure 2 and the lens element 10, with the second bearing surface 32 being provided on the other one of the support structure 2 and the lens element 10. In the example of FIG. 3, the helical bearing 30 does not constrain transverse translational movement of the lens element 10 with respect to the support structure 2, that is transverse to the direction of movement shown by arrow M. The bearing surface 32 is 'planar' in the sense that it is a surface which is not a groove and one which provides only a single point of contact with the ball. In other words, the bearing surface 32 is effectively planar across a scale of the width of the rolling bearing element 33, although be helical at a larger scale. For example, as pictured, the 'planar' surface is helical, being a line in cross section which twists helically along the movement direction, maintaining a single point of contact with the ball at any time. Alternatively and as mentioned above, in practical embodiments the length of the bearing surfaces 31 and 32 may be short, in which case the bearing surface 32 may be planar or close to planar, provided that the one or more helical bearings 30 of the helical bearing arrangement 20 guide helical movement of the lens element 10 with respect to the support structure 2.

A single rolling bearing element 33 is shown in FIGS. 2 and 3 by way of example, but in general may include any plural number of rolling bearing elements 33.

In some examples, the helical bearing 30 may include a single rolling bearing element 33. In that case, the helical bearing 30 by itself does not constrain the rotational movement of the lens element 10 with respect to the support structure 2 about the single rolling bearing element 33, that is around an axis transverse to the direction of movement shown by arrow M. However, this minimises the overall size of the helical bearing 30, and in particular the height of the helical bearing 30 projected along the helical axis H as it is only needed to accommodate the size of the rolling bearing element 33 and the relative travel of the bearing surfaces 31 and 32.

In other examples, the helical bearing 30 may include plural rolling bearing element 33. In that case, the helical bearing 30 constrains the rotational movement of the lens element 10 with respect to the support structure 2 about either one of the rolling bearing elements 33, that is around an axis transverse to the direction of movement shown by arrow M. However, compared to use of a single rolling bearing element 33, this increases the overall size of the helical bearing 30, and in particular the height of the helical bearing 30 projected along the helical axis H.

The helical bearing arrangement may in general comprise any number of helical bearings 30 with a configuration chosen to guide the helical movement of the lens element 10 with respect to the support structure 2 while constraining the movement of the lens element 10 with respect to the support structure 2 in other degrees of freedom. Many helical bearing arrangements may comprise plural helical bearings 30 and at least one which comprises plural rolling bearing elements 30.

Figure 6:
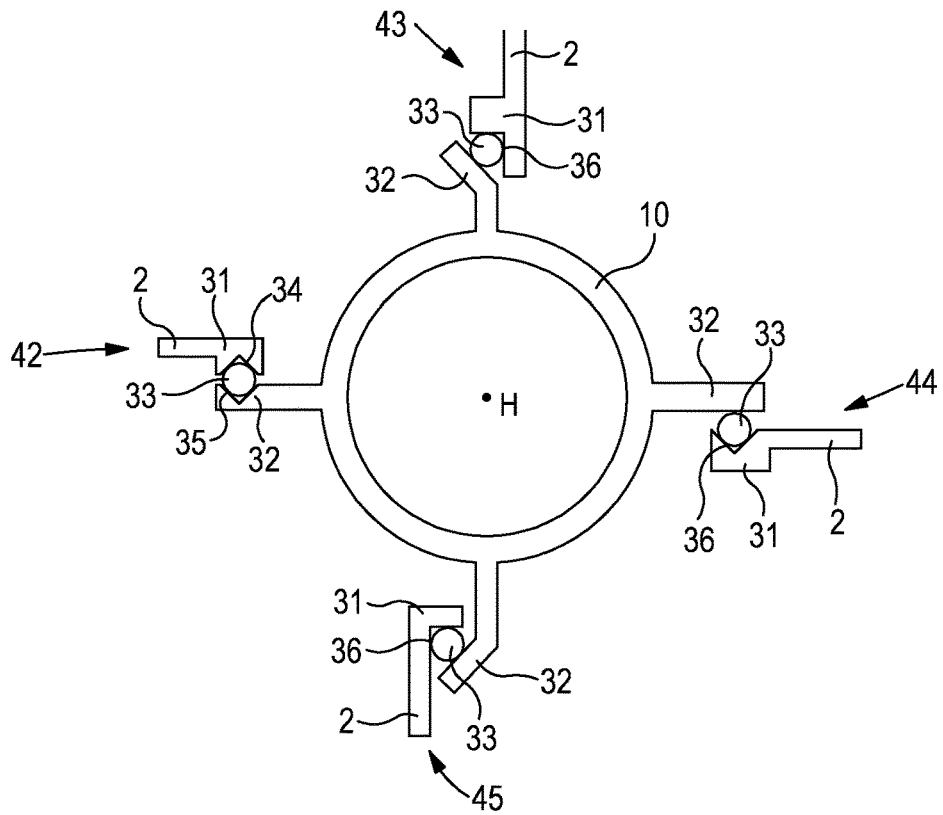

Some specific examples of the actuation apparatus 1 with different possible helical bearing arrangements are illustrated in FIGS. 4 to 6 which are schematic plan views normal to the helical axis showing the support structure 2, the lens element 10 and the helical bearings 30.

FIG. 4 illustrates a possible helical bearing arrangement that includes two helical bearings 37 and 38 only. The helical bearings 37 and 38 are arranged on opposite sides of the lens element 2.

The first helical bearing 37 is of the same type as the helical bearing 30 shown in FIG. 2 wherein the bearing surfaces 31 and 32 each comprise respective grooves 34 and 35. The first helical bearing 37 includes plural rolling bearing elements 33 to constrain the relative movement of the lens element 10 and the support structure 2.

The second helical bearing 38 is of the same type as the helical bearing 30 shown in FIG. 3 wherein the first bearing surface 31 comprises a groove 36 in which the rolling bearing elements 33 are seated and the second bearing surface 32 is planar.

FIG. 4 illustrates the case that the first bearing surface 31 of the second helical bearing 38 is on the support structure 2, but it could alternatively be on the lens element 10. The second helical bearing 38 may comprise a single rolling bearing element 33 or plural rolling elements 33 and principally adds a constraint against relative rotation of the lens element 10 and the support structure 2 around the direction of movement (arrow M) of the first helical bearing 37.

The helical bearing arrangement of FIG. 4 includes a smaller number of helical bearings (i.e. two) than the other examples below, which simplifies the construction and reduces footprint of the actuation apparatus 1.

FIG. 5 illustrates a possible helical bearing arrangement that includes three helical bearings 39, 40 and 41 only. The three helical bearings 39, 40 and 41 are equally angularly spaced around the helical axis H, but they could alternatively be spaced unequally.

The first and second helical bearings 39 and 40 are of the same type as the helical bearing 30 shown in FIG. 2 wherein the bearing surfaces 31 and 32 each comprise respective grooves 34 and 35.

The third helical bearing 41 is of the same type as the helical bearing 30 shown in FIG. 3 wherein the first bearing surface 31 comprises a groove 36 in which the rolling bearing element 33 is seated and the second bearing surface 32 is planar. FIG. 5 illustrates the case that the first bearing surface 31 of the third helical bearing 41 is on the lens element 10, but it could alternatively be on the support structure 2.

Each of the three helical bearings 39, 40 and 41 may comprise a single rolling or plural bearing elements 33. This is possible because the constraints imposed by three helical bearings 39, 40 and 41, and in particular the grooves of the first and second helical bearings 39 and 40 sufficient to constrain the movement of the lens element 10 with respect to the support structure 2 in degrees of freedom other than the helical movement. As a result of using only a single rolling bearing element 33 in each of the three helical bearings 39, 40 and 41, the overall size of the three helical bearings 39, 40 and 41, and in particular the height of the three helical bearings 39, 40 and 41 projected along the helical axis H is reduced compared to the helical bearing arrangement of FIG. 4.

FIG. 6 illustrates a possible helical bearing arrangement that includes four helical bearings 42 to 45 only. The four helical bearings 42 to 45 are equally angularly spaced around the helical axis H.

The first helical bearing 42 is of the same type as the helical bearing 30 shown in FIG. 2 wherein the bearing surfaces 31 and 32 each comprise respective grooves 34 and 35.

The second, third and fourth helical bearings 43, 44 and 45 are each of the same type as the helical bearing 30 shown in FIG. 3 wherein the first bearing surface 31 comprises a groove 36 in which the rolling bearing element 33 is seated and the second bearing surface 32 is planar. FIG. 6 illustrates the case that the first bearing surface 31 of the second, third and fourth helical bearings 43, 44 and 45 is on the lens element 10, but it could alternatively be on the support structure 2.

Each of the second, third and fourth helical bearings 43, 44 and 45 may comprise a single rolling bearing element 33 while the first helical bearing 42 comprises two rolling bearing elements. This is possible because the constraints imposed by four helical bearings 42 to 45 are sufficient to constrain the movement of the lens element 10 with respect to the support structure 2 in degrees of freedom other than the helical movement.

Figure 7:
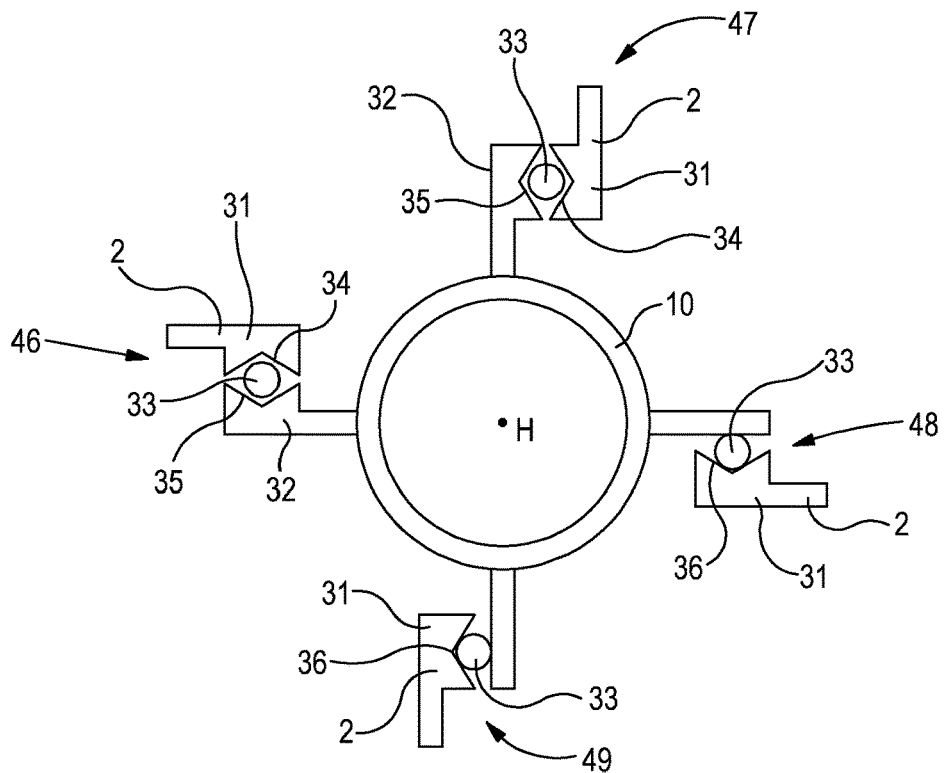

FIG. 7 illustrates another possible helical bearing arrangement that includes four helical bearings 46 to 49 only. The four helical bearings 46 to 49 are equally angularly spaced around the helical axis H, but they could alternatively be spaced unequally.

The first and second helical bearings 46 and 47 are of the same type as the helical bearing 30 shown in FIG. 2 wherein the bearing surfaces 31 and 32 each comprise respective grooves 34 and 35.

The third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 7 illustrates the case that the first bearing surface 31 of the third and fourth helical bearings 48 and 49 is on the lens element 10, but it could alternatively be on the support structure 2.

Each of the four helical bearings 46 to 49 may comprise a single rolling bearing element 33. This is possible because the constraints imposed by four helical bearings 46 to 49 are sufficient to constrain the movement of the lens element 10 with respect to the support structure 2 in degrees of freedom other than the helical movement. As a result of using only a single rolling bearing element 33 in each of the four helical bearings 46 to 49, the overall size of the four helical bearings 46 to 49, and in particular the height of the four helical bearings 46 to 49 projected along the helical axis H is reduced compared to the helical bearing arrangement of FIG. 4.

In each of the helical bearing arrangements of FIGS. 4 to 7, the bearing surfaces 32 which are on the lens element 10 are each arranged on the same side of (all above or all below) the bearing surfaces 31 on the support structure 2. As the bearing surfaces 31 and 32 extend helically, this means that in the view of FIG. 5 which is a cross-section perpendicular to the helical axis H, all the bearing surfaces 32 which are on the lens element 10 are on the right of the bearing surfaces 31 on the support structure 2 as viewed outwardly of the helical axis H, and in the view of FIGS. 6 and 7 all the bearing surfaces 32 which are on the lens element 10 are on the left of the bearing surfaces 31 on the support structure 2 as viewed outwardly of the helical axis H. As a result of this arrangement, the helical bearings all the bearing surfaces 31 on the support structure 2 face in the same direction as each other, which assists in manufacture of the bearing surfaces 31 by the same tool. Similarly, manufacturing advantages apply to the bearing surfaces 32 on the lens element 2 which also face in the same direction as each other.

As a result of this arrangement, all the helical bearings 30 need to be loaded in the same helical sense. Thus loading of the helical bearings 30 may be provided by applying a loading force along the helical axis H, a loading force around the helical axis H, or a combination thereof. In some arrangements described below, this loading force is applied by the resilient biasing element 70 which resiliently biases the at least one SMA actuator wire 60. In embodiments described below, loading of the helical bearings 30 is provided by a loading arrangement 90 that is configured to apply a biasing force in a direction that is at least substantially normal to the helical movement path over the operating range of the helical movement.

Figure 8:
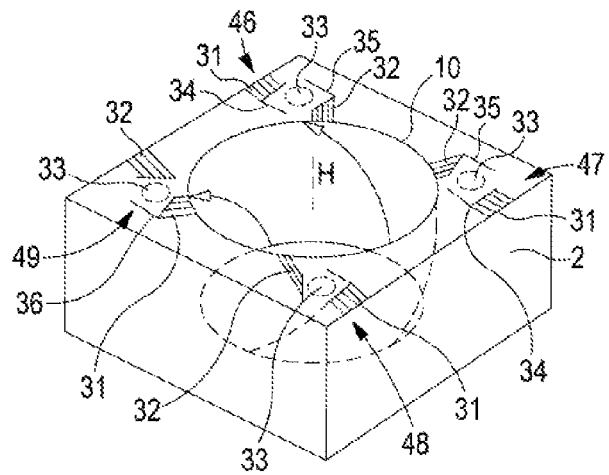
FIG. 8 is a perspective view of the actuation apparatus with another possible helical bearing arrangement.

FIG. 8 illustrates another possible helical bearing arrangement that is a modification of the helical bearing arrangement of FIG. 7. Thus, the helical bearing arrangement includes four helical bearings 46 to 49 only, and the four helical bearings 46 to 49 are equally angularly spaced around the helical axis H, but they could alternatively be spaced unequally.

As in the helical bearing arrangement of FIG. 7, (a) the first and second helical bearings 46 and 47 are of the same type as the helical bearing 30 shown in FIG. 2 wherein the bearing surfaces 31 and 32 each comprise respective grooves 34 and 35, and (b) the third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 8 illustrates the case that the first bearing surface 31 of the third and fourth helical bearings 48 and 49 is on the lens element 10, but it could alternatively be on the support structure 2.

As in the helical bearing arrangement of FIG. 7, each of the four helical bearings 46 to 49 may comprise a single rolling bearing element 33. This is possible because the constraints imposed by four helical bearings 46 to 49 are sufficient to constrain the movement of the lens element 10 with respect to the support structure 2 in degrees of freedom other than the helical movement. As a result of using only a single rolling bearing element 33 in each of the four helical bearings 46 to 49, the overall size of the four helical bearings 46 to 49, and in particular the height of the four helical bearings 46 to 49 projected along the optical axis is reduced when each of the helical bearings has a single rolling element only.

However, the helical bearing arrangement of FIG. 8 is modified compared to that of FIG. 7 to change the arrangement of the bearing surfaces 31 and 32 in the individual bearings 46 to 49, as follows. In the first helical bearing 46, the bearing surfaces 32 on the lens element 10 are above the bearing surfaces 31 on the support structure 2 as viewed along the helical axis H, whereas in the second helical bearing 47, the bearing surfaces 32 on the lens element 10 are below the bearing surfaces 31 on the support structure 2 as viewed along the helical axis H. Similarly, in the third helical bearing 48, the bearing surfaces 32 on the lens element 10 are above the bearing surfaces 31 on the support structure 2 as viewed along the helical axis H, whereas in the fourth helical bearing 49, the bearing surfaces 31 on the lens element 10 are below the bearing surfaces 32 on the support structure 2 as viewed along the helical axis H.

This may be understood on the following basis with reference to a constraint of the bearings in the vertical plane, parallel to the helical axis. The first and third helical bearings 46 and 48 constrain the lens element 10 from moving down, and the second and fourth helical bearings 47 and 49 constrain the lens element 10 from moving up, or rotating around an axis between first and third helical bearings 46 and 48.

As a result of this ("over-constrained") arrangement, the helical bearings 46 to 49 do not all need to be loaded in the same helical sense around the helical axis H. This facilitates the loading of the helical bearings 46 to 49. For example, this arrangement allows for loading by a couple provided by the SMA actuator wires 60.

Figure 9A:
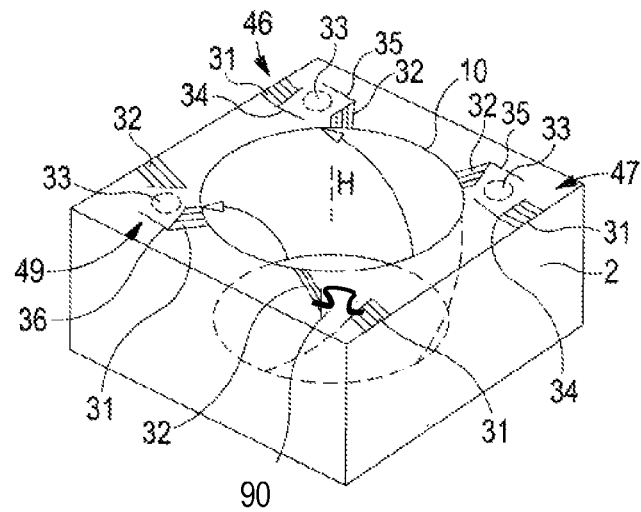
FIGS. 9A and 9B are respectively perspective and cross-sectional views of a helical bearing arrangement according to an embodiment of the present invention.
Figure 9B:
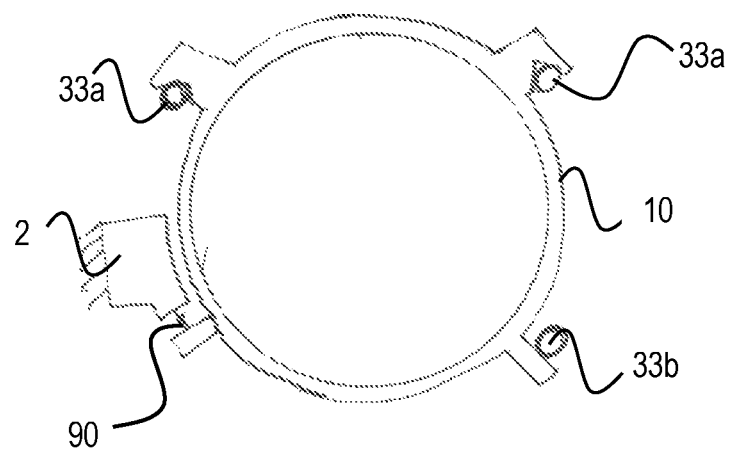

FIGS. 9A and 9B are respectively perspective and cross-sectional views of an actuation apparatus 1 according to certain embodiments of the present invention. The embodiments are each broadly similar to that of FIG. 8 except that a resilient loading arrangement 90 is provided in place of one of the four helical bearings, i.e. in place of the third helical bearing 48.

The three remaining bearings 46, 47, 49 are sufficient to constrain the movement of the lens element 10 in the five relevant degrees of freedom and to guide helical movement of the lens element 10 along a helical path around the helical axis H (this path will also be referred to as the "helical movement path"). This is because the bearings 46, 47, 49 consist of two "pinned" bearings 46, 47 (in which the rolling bearing element 33a is configured to move in grooves 34, 35 provided in the respective bearing surfaces 31, 32) and one "slider" bearing 49 (in which the rolling bearing element 33b is slidable on one 32 of the two bearing surfaces 31, 32).

As will be explained in more detail below, the loading arrangement 90 is configured to apply a biasing force in a direction that is at least substantially normal to the helical movement path over the operating range of the helical movement.

Broadly speaking, the loading arrangement 90 may act in compression such that it "pushes" on the relevant part of the lens element 10 or may act in tension such that it "pulls" on the relevant part of the lens element 10. In FIGS. 9A and 9B, the loading arrangement 90 is acting in compression. Hence, for example, the biasing force positively loads the sliding bearing surface 32. As will be appreciated, an equivalent biasing force could be produced with a loading arrangement 90 acting in tension and with the relative positions of the relevant parts of the support 2 and the lens element 10 reversed.

As will become apparent, the loading arrangement 90 is configured to apply the biasing force even when the SMA actuator wires 60 are in an unenergized state, e.g. when the actuation mechanism is powered off.

Various different loading arrangements 90 may be used for exerting the biasing force. In a first set of examples (illustrated in FIGS. 10 to 12), the loading arrangement 90 does not include any bearing elements such as rolling bearing elements. In a second set of examples (illustrated in FIG. 13), the loading arrangement includes a bearing element.

The loading arrangement 90 may be used with any of the helical bearing arrangements 20 described herein (see e.g. FIG. 3).

The loading arrangements illustrated in FIGS. 10A to 10D each comprise a flexure 90 connected between, and attached to each of, the support structure 2 and the lens element 10. The flexure 90 is configured to exert a biasing force directly on the lens element and the support structure in a direction normal to the helical movement path over the operating range of the helical movement. The flexure 90 has a planar (or substantially planar) profile and may comply to the profiles of corresponding surfaces to which it is attached. The flexure 90 can act in compression or tension, e.g. the biasing force may be effected by recovery from bending or resistance to bending of the flexure.

Figure 10A:
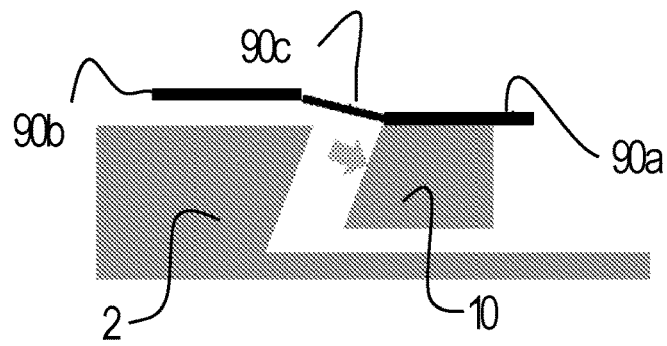
FIGS. 10A to 10D are side views of possible loading'.

In the embodiment illustrated in FIG. 10A, the flexure 90 comprises a first portion 90a, a second portion 90b and an intermediate portion 90c. In this case, the intermediate portion 90c is a preformed (or "jogged") portion having a predetermined shape. More specifically, the intermediate portion 90c is angled from the first portion 90a and the second portion 90b. Thus, the second portion 90b can be considered as a raised portion in relation to the first portion 90a. As illustrated, the first portion 90a of the flexure may first be attached to an external surface of the lens element 10. Attaching the second portion 90b to the support structure then requires resiliently deforming the intermediate portion 90c, e.g. as the raised second portion 90b is pressed vertically onto the support structure 2. As the intermediate portion 90c recovers from this deformation, it pushes the lens element 2 and exerts a biasing force in a direction normal to the helical movement path, as indicated by the arrow. Moreover, the flexure 90 is designed to provide a similar biasing force throughout the operating range of helical movement. Since the biasing force acts in a direction normal to the helical movement of the lens element, the resistance to such helical movement is significantly limited or reduced. Moreover, since the force is similar throughout the operating range of helical movement, the behaviour of the bearings will be similar, aiding performance (e.g. controllability) of the actuation apparatus 1.

Figure 10B:
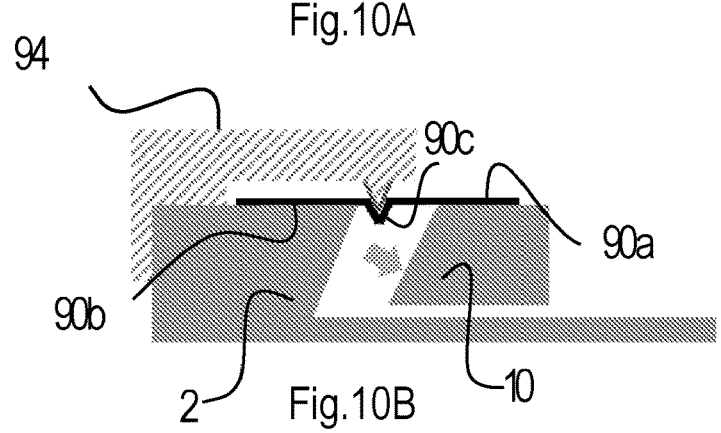

In another embodiment as illustrated in FIG. 10B, the flexure 90 comprises a first portion 90a, a second portion 90b and an intermediate portion 90c. The first portion 90a and the second portion 90b of the flexure are aligned prior to assembly. In this embodiment, the intermediate portion 90c comprises a feature that allows for an interference fit with a tip of a cantilever 94, which in turn is clamped onto the support structure 2. The tip of the cantilever 94 forces or compresses the first portion 90a and second portion 90b onto a surface of each of the lens element 10 and the support structure 2. In turn, the flexure 90 applies a biasing force directly onto the surfaces of the lens element 10 and the support structure 2, in a direction normal to the helical movement path.

Figure 10C:
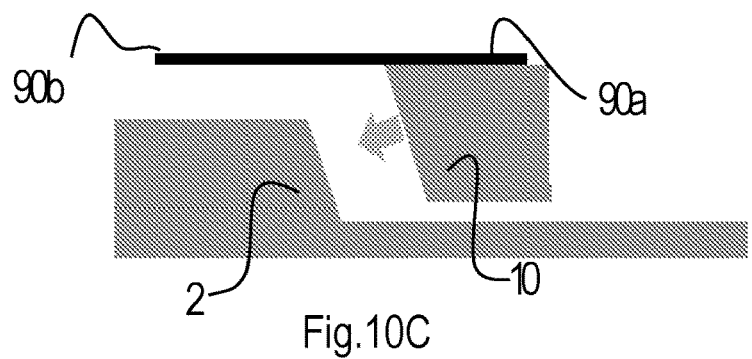

In yet another embodiment as illustrated in FIG. 10C, the flexure 90 initially comprises a planar profile. As illustrated, a first portion 90a of the flexure may first be attached to a surface of the lens element 10. Attach a second portion 90b to the support structure then requires resiliently deforming the flexure 90, e.g. as the second portion 90b is pressed vertically onto the support structure 2 to preload the flexure 90. As the flexure 90 recovers from this deformation, it exerts a biasing force on the lens element 10 in a direction normal to the helical movement path, as indicated by the arrow.

Figure 10D:
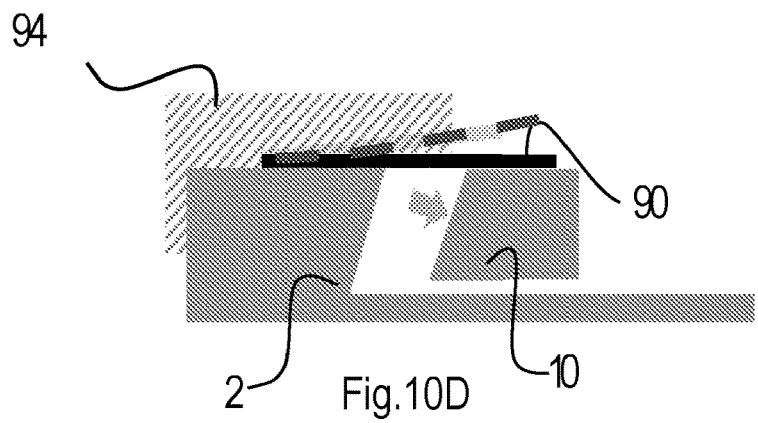

In yet another embodiment as illustrated in FIG. 10D, the flexure 90 acts in a similar manner as the flexure of FIG. 10A. In this embodiment, the flexure 90 comprises a slightly curved profile (shown as a dotted line in FIG. 10D) prior to attachment. Once the curved flexure 90 is attached to the lens element and the support structure, the curved flexure 90 is straightened. The attachment is preferably carried out using a clamp 94 to suitably deform (straighten) the flexure 90. Hence, as the intermediate portion 90c recovers from deformation or straightening, it exerts a biasing force on the lens element in a direction normal to the bearing surface 102, as indicated by the arrow.

The embodiments illustrated in FIGS. 10A to 10D employ relatively short flexures. In other embodiments, other forms of flexures, including relatively long flexures, may be used to achieve a similar effect.

Figure 11A:
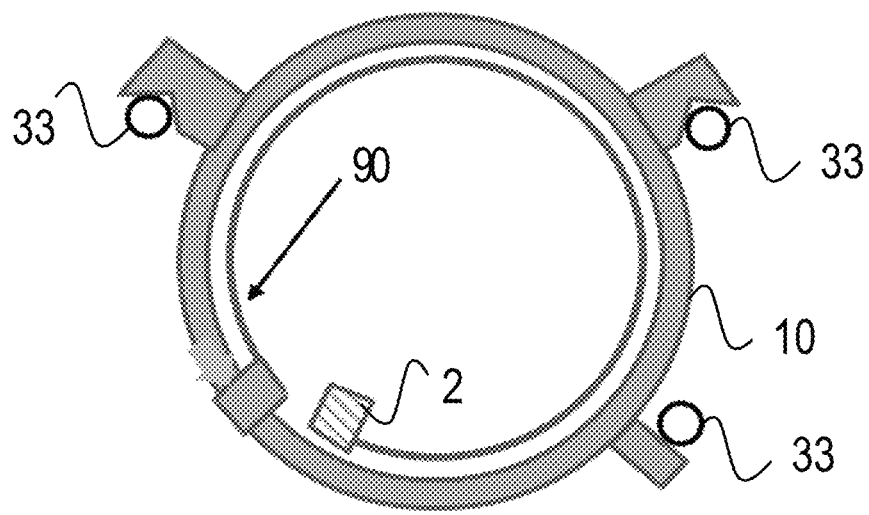
FIGS. 11A and 11B are plan views of possible loading arrangements.

For example, as illustrated in the plan view of FIG. 11A, the loading arrangement 90 may include a circlip spring 90 (or, in other words, a circular flexure) extending around the helical axis of the helical bearing arrangement. The circlip spring 90 is connected to the support structure 2 and the movable element 10 at each of its ends. Once assembled, the circlip spring 90 is in compression or tension and exerts a biasing force normal to the helical movement path.

Figure 11B:
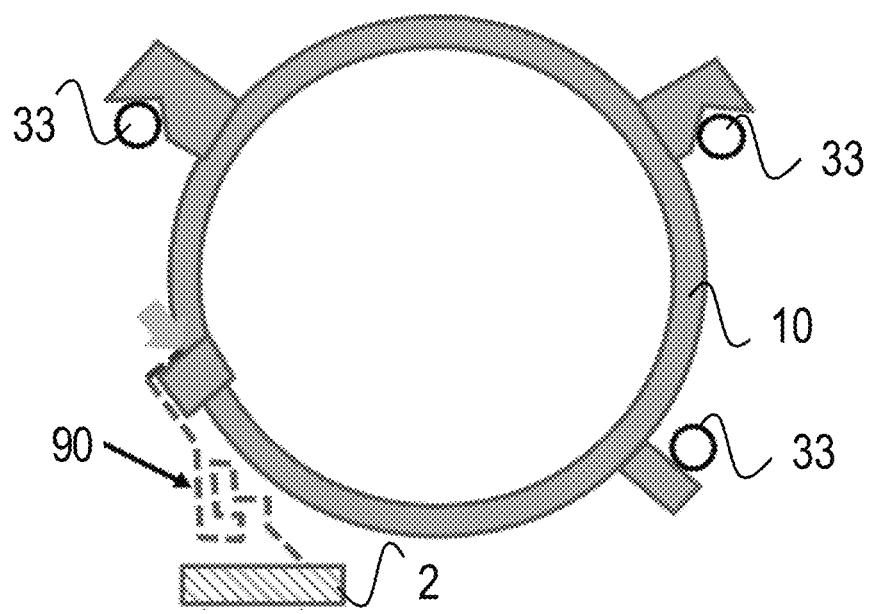

Alternatively, as illustrated in the plan view of FIG. 11B, the loading arrangement 90 may include an etched spring flexure 90 which, upon attaching to the movable element 10 and the support structure 2, is in tension or compression. The flexure 90 may have any suitable shape. Instead of being etched, the flexure 90 may be a coiled spring or a spring moulded into the surface of the movable element 10 and/or the support structure 2. The flexure 90 is connected to the support structure 2 and the movable element 10 at each of its ends. One or both ends of the flexure 90 may be fixed or hooked onto the respective support structure 2 or lens element 10. Once assembled, the flexure 90 is in tension or compression and exerts a biasing force on the lens element 10 that, due at least in part to the relatively long length of the flexure 90, remains similar throughout the range of helical movement of the lens element 10.

Optionally, such a flexure 90 can also be used to create a common electrical connection between the support structure 2 and the lens element 10. The crimp portions 61 for the SMA actuator wire 60 (as described below) could be connected mechanically and electrically to the common connection and inserts, or etched additions, on the support structure 2, for example by laser welding.

FIGS. 12A to 12D illustrates further examples of the loading arrangement 90.

Figure 12A:
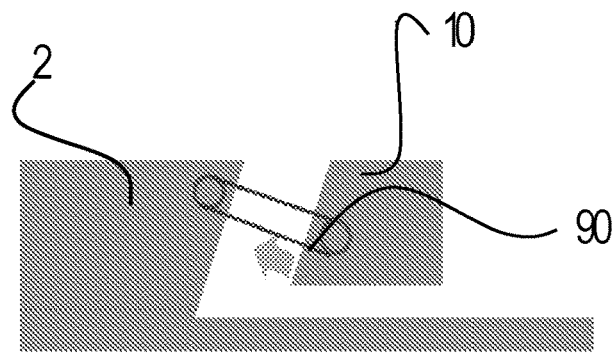
FIGS. 12A to 12D are side views of possible loading arrangements.
Figure 12B:
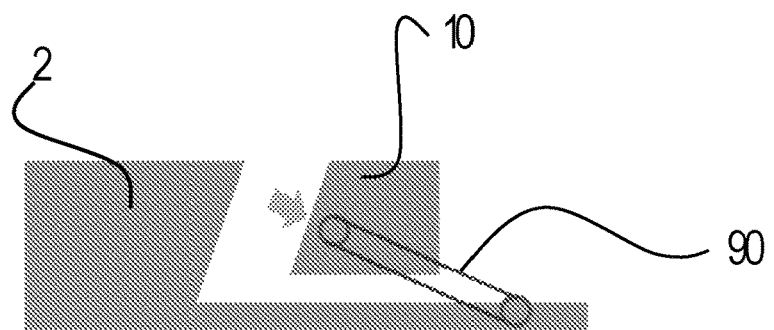

The examples illustrated in FIGS. 12A and 12B each include an elongate elastic element 90 (e.g. an elastic band, a coil spring or a spring formed from a moulded or etched component, etc.) attached between the lens element 10 and the support structure 2. The elastic element 90 extends in a direction normal to the helical movement path. Therefore, for example, as the elastic element 90 contracts, it exerts a biasing force in a direction substantially normal to this path.

Figure 12C:
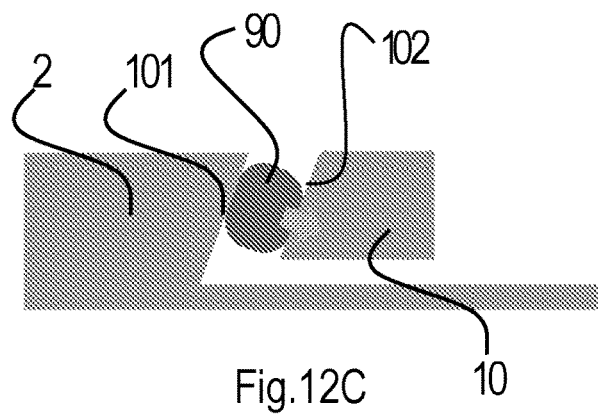

In the example illustrated in FIG. 12C, the loading arrangement 90 includes a volume of elastic material 90 e.g. a soft glue, silicone or other suitable material. The elastic material 90 is located between, and is adhered to, respective surfaces 101, 102 of the support structure 2 and the lens element 10. In this example, the elastic material 90 is in compression during operation and pushes on the lens element 2, with the direction of the biasing force being determined at least in part by the orientation of the surfaces 101, 102. During assembly, this pre-compression can be achieved by introducing the elastic material 90 while the lens element 10 is held in a position relative to the support structure 2 such that the surfaces 101, 102 are slightly further apart than they are during operation. The rolling bearing elements 33 can then be introduced into the bearings 46, 47, 49, moving (rotating) the lens element 10 and compressing the elastic material 90. Instead of acting in compression, the elastic material 90 may act in tension, or in shear.

Figure 12D:
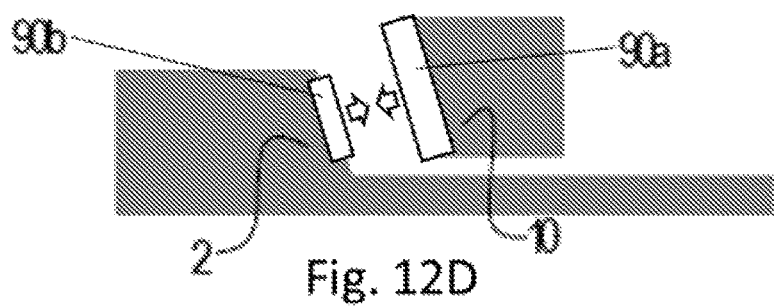

The loading arrangement 90 illustrated in FIG. 12D is a magnetic loading arrangement 90. The magnetic loading arrangement 90 comprises a first magnetic element 90a mounted to the lens element 10 and a second magnetic element 90b mounted to the support structure 2. The magnetic loading arrangement 90 is configured to exert a biasing force between the lens element 10 and the support structure 2 in a direction normal to the helical movement path over the operating range of the helical movement.

At least one of the first magnetic element 90a and second magnetic element 90b comprises a magnet. The other of the first magnetic element 90a and second magnetic element 90b comprises a magnet or a ferrous material, such as stainless steel. Alternatively, the other of the first magnetic element 90a and second magnetic element 90b may comprise a magnetically permeable material, such as nickel and cobalt.

In the depicted embodiment, the first and second magnetic elements 90a, 90b are configured to attract each other. The portion of the support structure 2 to which the second magnetic element 90b is mounted is urged towards the portion of the lens element 10 to which the first magnetic element 90a is mounted. However, in an alternative embodiment, the first and second magnetic elements 90a, 90b may be configured to repel each other. The portion of the support structure 2 to which the second magnetic element 90b is mounted is urged away from the portion of the lens element 10 to which the first magnetic element 90a is mounted. In either case, the magnetic loading arrangement 90 may load the helical bearing.

The first and second magnetic elements 90a, 90b each comprise a surface that faces the other of the first and second magnetic elements 90a, 90b. These two surfaces oppose each other and are separated by a gap. The extent of the gap between the two surfaces may remain substantially constant over the operating range of the helical movement. This may contribute to keeping the biasing force between lens element 10 and the support structure 2 constant over the operating range.

The two surfaces may be arranged parallel to the helical movement path. The magnetic field lines between these two surfaces may extend substantially normal to the helical movement path, such that the biasing force on the lens element 10 and the support structure 2 is exerted in a direction normal to the helical movement path.

The extent of one of the first and second magnetic elements 90a, 90b in a direction parallel to the surfaces that are facing each other (e.g. parallel to the helical movement path) may be greater than the extent of the other of the first and second magnetic elements 90a, 90b in that direction. So, the extent of one of these surfaces is greater than that of the other surface, in a direction along the helical movement path. For example, as shown in FIG. 13c, the first magnetic element 90a may be longer than the second magnetic elements 90b along the helical movement path. Thus, as the lens element 10 moves along the helical movement path, the proportion of the surfaces of the first and second magnetic elements 90a, 90b that face each other remains constant. This may contribute to keeping the biasing force between lens element 10 and the support structure 2 constant over the operating range.

Figure 13A:
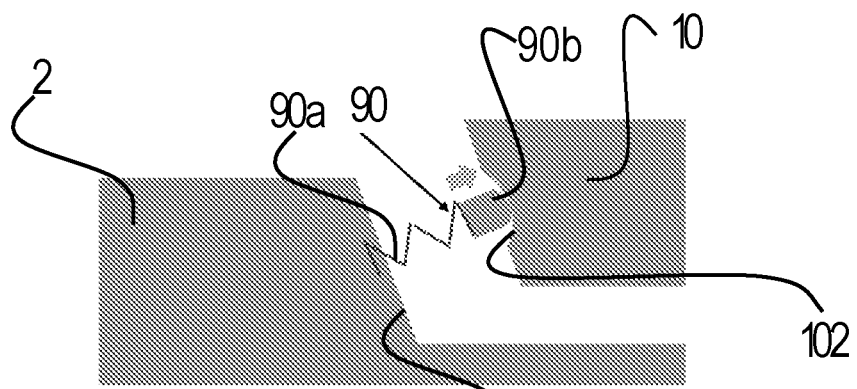
FIGS. 13A to 13C are side views of possible loading arrangements.
Figure 13B:
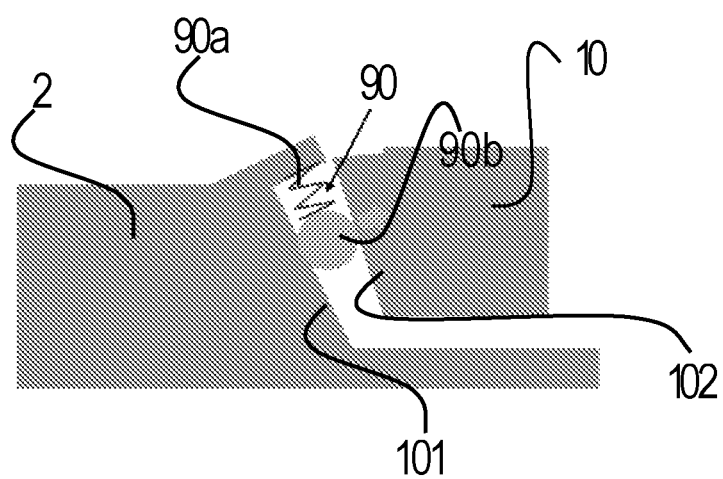
Figure 13C:
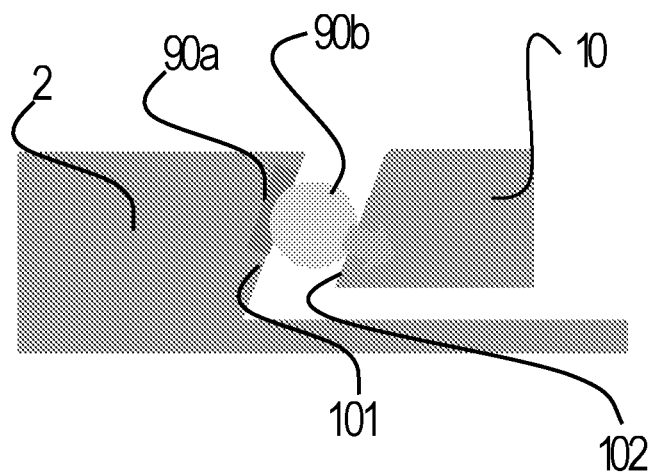

FIGS. 13A to 13C illustrates further examples of the loading arrangement 90. In each of these cases, the loading arrangement includes a bearing element 90b which bears on a surface 101 of the support structure 2 and/or on a surface 102 of the lens element 10. The loading arrangement 90 is preferably located between the surfaces 101, 102.

FIG. 13A illustrates one such loading arrangement 90. The loading arrangement 90 includes a coil spring 90a attached at one end to one of the surfaces 101 and exerting a biasing force in a direction normal to the other surface 102. A ball bearing 90b is provided at the free end of the coil spring 90a and contacts the surface 102, which may include a groove or other suitable feature to guide movement of the ball bearing 90b. In other embodiments, another type of bearing element with a rounded contacting surface may be used in place of the ball bearing 90b. Another type of spring element may also be used in place of the coil spring 90a.

FIG. 13B illustrates another loading arrangement 90. In this example, the surfaces 101, 102 are angled relative to each other, thereby forming a narrowing gap therebetween. A coil spring 90a is configured to exert a force onto a rolling bearing element 90b (e.g. a ball or a roller) in a direction towards the narrower end of the gap. The ball bearing 90b transmits the force to the angled bearing surfaces 101, 102 which are configured such that the lens element 2 is biased in a direction normal to the helical movement path.

FIG. 13C illustrates another loading arrangement 90. In this embodiment, a rolling bearing element 90b (for example a ball or a roller) is disposed between the two surfaces 101, 102. One (or possibly both) of the surface 101, 102 includes a volume 90a of an elastic (e.g. elastomeric) material which is in contact with the rolling bearing element 90b and is in compression during operation, thereby producing a force that is transmitted via the rolling bearing element 90b to the other one of the surfaces 101, 102. Again, the surfaces 101, 102 are configured such that the lens element 2 is biased in a direction normal to the helical movement path.

Figure 14:
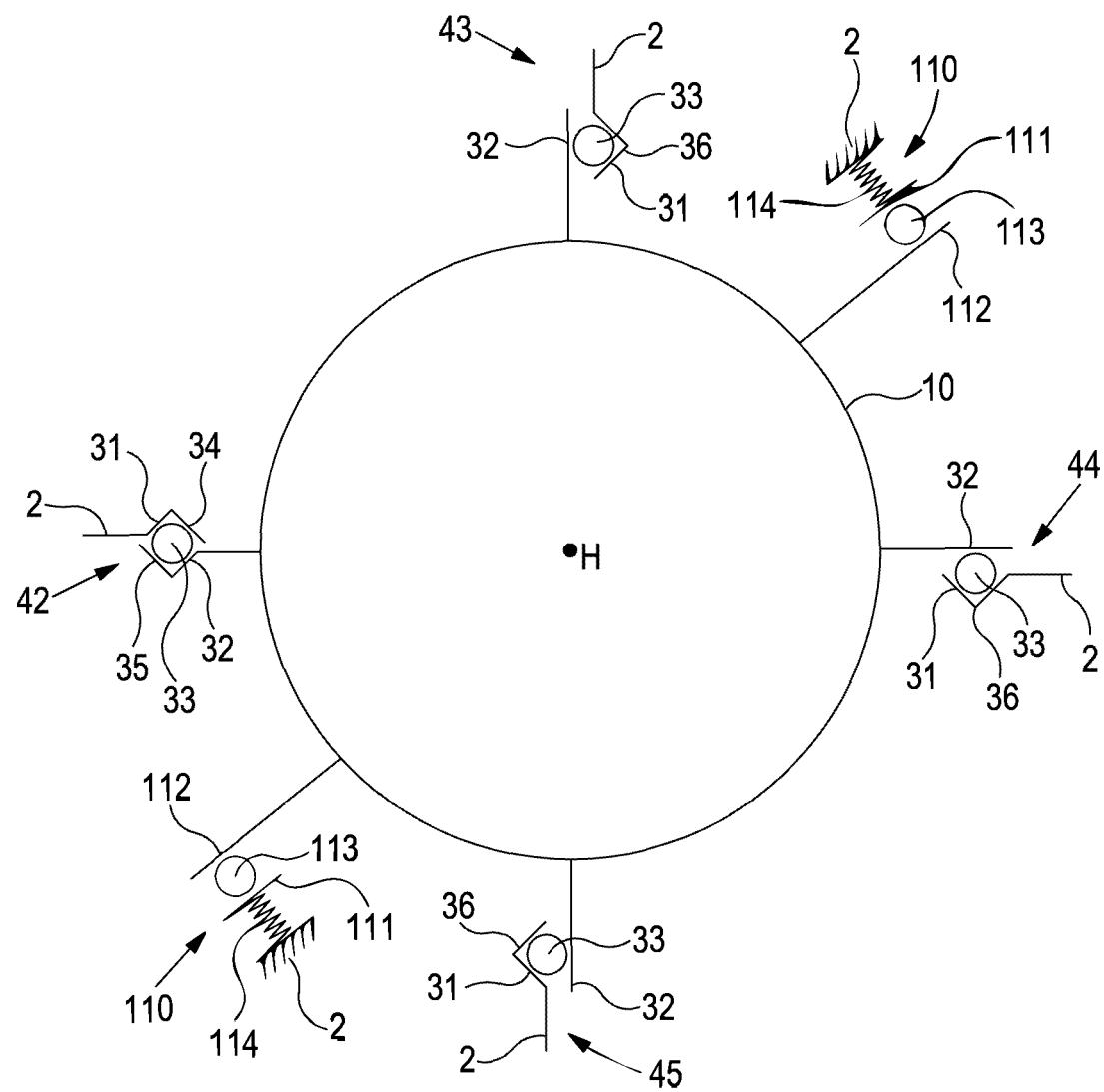
FIG. 14 is a schematic cross-sectional view of the actuation apparatus with yet another possible helical bearing arrangement.

FIG. 14 shows an example of the actuation apparatus 1 with a helical bearing arrangement which is similar to that of FIG. 6 but with some modifications as will now be described. The helical bearing arrangement includes four helical bearings 42 to 45 that are arranged in the same as in FIG. 6, as described above. The helical bearings 42 to 45 each include a single rolling bearing element 33, so that they provide a total of five constraints. The first helical bearing 42 is of the same type as the helical bearing 30 shown in FIG. 2, wherein the bearing surfaces 31 and 32 each comprise respective grooves 34 and 35. The second, third and fourth helical bearings 43, 44 and 45 are each of the same type as the helical bearing 30 shown in FIG. 3, wherein the first bearing surface 31 comprises a groove 36 in which the rolling bearing element 33 is seated and the second bearing surface 32 is planar. As in FIG. 6, the first bearing surface 31 of the second, third and fourth helical bearings 43, 44 and 45 is illustrated as being on the lens element 10, but it could alternatively be on the support structure 2.

The bearing surfaces 32 which are on the lens element 10 are each arranged on the same side of (all above or all below) the bearing surfaces 31 on the support structure 2. As the bearing surfaces 31 and 32 extend helically, this means that in the view of FIG. 14 which is a cross-section perpendicular to the helical axis H, all the bearing surfaces 32 which are on the lens element 10 are on the left of the bearing surfaces 31 on the support structure 2 as viewed outwardly of the helical axis H. As a result of this arrangement, all the helical bearings 42 to 46 need to be loaded in the same helical sense, corresponding to a clockwise rotation of the lens element 2 in FIG. 14.

To provide such loading, the helical bearing arrangement is modified compared to FIG. 6 to include two additional rolling bearings 110 that are helical bearings arranged as follows. The rolling bearings 110 comprise a first bearing surface 111, a second bearing surface 112 and a rolling bearing element 113 (for example a ball or a roller) disposed between the first and second bearing surfaces 111 and 112. The first bearing surface 111 is movable with respect to the support structure 2 and a resilient element 114 is arranged between the first bearing surface 111 and the support structure 2. The resilient element 114 loads the first bearing surface 111 away from the support structure 2, thereby acting as a resilient loading arrangement that resiliently loads the first bearing surface 111 against the rolling bearing element 113. As an alternative, the rolling bearing element 110 could be reversed so that the second bearing surface 112 is movable with respect to the lens element 10 and the resilient element 114 loads the second bearing surface 112 against the rolling bearing element 113. The additional rolling bearings 110 may have any suitable construction, including the construction of the rolling bearing 110 in any of the examples of FIGS. 9 to 13.

The additional rolling bearings 110 are arranged the opposite way around relative to the helical bearings 42 to 46 so that they load the helical bearings 42 to 46 in the same helical sense, corresponding to a clockwise rotation of the lens element 2 in FIG. 14. As a result, the helical bearing arrangement shown in FIG. 14 is highly balanced and the tolerances are reduced, which assists manufacture. Similarly to the helical bearing arrangement of FIG. 6, manufacture of the helical bearings 42 to 46 is assisted by all the bearing surfaces 31 on the support structure 2 facing in the same direction as each other, and all the bearing surfaces 32 on the lens element 10 facing in the same direction as each other.

Two additional rolling bearings 110 are shown here, arranged on opposite sides of the lens element 2. More generally, any number of one or more additional rolling bearings 110 may be provided, but plural additional rolling bearings 110 spaced around the lens element 2 are advantageous to assist balancing of forces. Instead of the two additional rolling bearings 110, any of the loading arrangements 90 described in relation to FIGS. 9 to 13 may be provided.

In the above examples, the helical bearings 30 are rolling bearings, but each case the helical bearings 30 may be replaced by a sliding bearing, two examples of which are shown in FIGS. 15 to 18.

Figure 15:
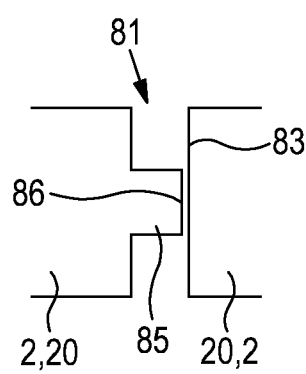
FIG. 15 is a cross-sectional view of a first alternative bearing, the cross-section being taken perpendicular to the direction of movement of the bearing.
Figure 16:
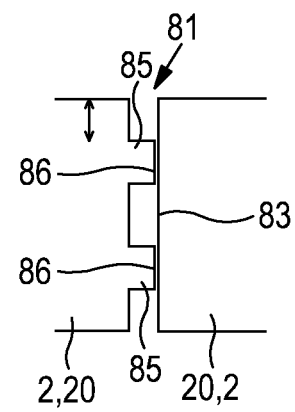
FIG. 16 is a side view of the first alternative bearing of FIG. 15.

In the first example shown in FIGS. 15 and 16, the plain bearing 81 comprises an elongate bearing surface 83 on one of the support structure 2 and the lens element 10. The plain bearing 81 also comprises protrusions 85 formed on the other of the support structure 2 and lens element 10, the ends of the protrusions 85 forming bearing surfaces 86 which bear on the elongate bearing surface 83. Although two protrusions 85 are shown in this example, in general any number of one or more protrusions 85 may be provided. The elongate bearing surface 83 and the bearing surfaces 86 are conformal, both being planar in this example, so as to permit relative movement of the lens element 10 with respect to the support structure 2. The elongate bearing surface 83 and the bearing surfaces 86 desirably have a coefficient of friction of 0.2 or less.

Figure 17:
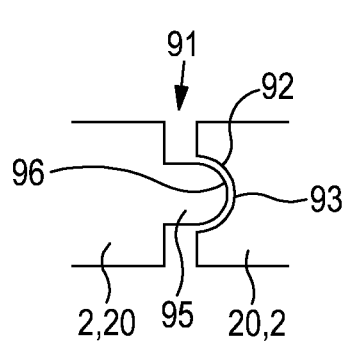
FIG. 17 is a cross-sectional view of a second alternative bearing, the cross-section being taken perpendicular to the direction of movement of the bearing.
Figure 18:
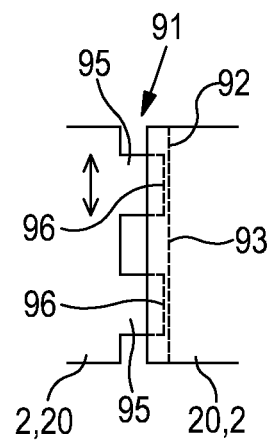
FIG. 18 is a side view of the alternative bearing of FIG. 17.

In the second example shown in FIGS. 17 and 18, the plain bearing 91 comprises a channel 92 on one of the support structure 2 and the lens element 10, the inner surface of the channel 92 forming a bearing surface 93. The plain bearing 91 comprises protrusions 95 formed on the other of the support structure 2 and lens element 10, the ends of the protrusions 95 forming bearing surfaces 96 which bear on the bearing surface 93. Although two protrusions 95 are shown in this example, in general any number of one or more protrusions 95 may be provided. The elongate bearing surface 93 and 32 the bearing surfaces 96 are conformal, both being planar in this example, so as to permit relative movement of the lens element 10 with respect to the support structure 2. The elongate bearing surface 93 and the bearing surfaces 96 desirably have a coefficient of friction of 0.2 or less.

In each of the plain bearings 81 and 91, the materials of the bearing surfaces 83, 86, 93, 96 are chosen to provide smooth movement and a long life. The bearing surfaces 83, 86, 93, 96 may be unitary with the underlying component or may be formed by a surface coating. Suitable materials include, for example PTFE or other polymeric bearing materials, or metal.

In each of the plain bearings 81 and 91, a lubricant may be provided on the bearing surfaces 83, 86, 93, 96. Such a lubricant may be a powder or a fluid, for example. Suitable lubricants include: graphite; silicon paste or a low viscosity oil.

Figure 19:
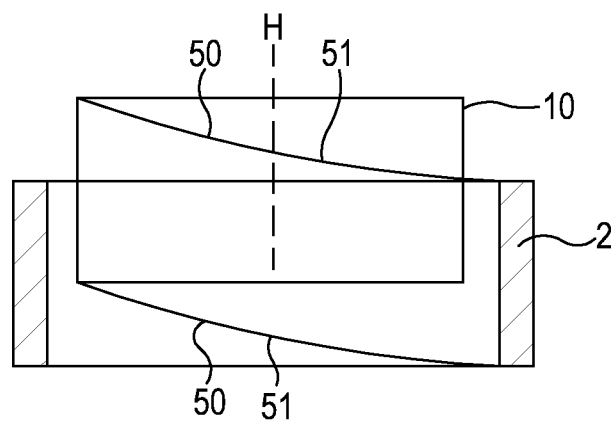
FIG. 19 is a side view of the actuation apparatus with a helical bearing arrangement comprising plural flexures.
Figure 20:
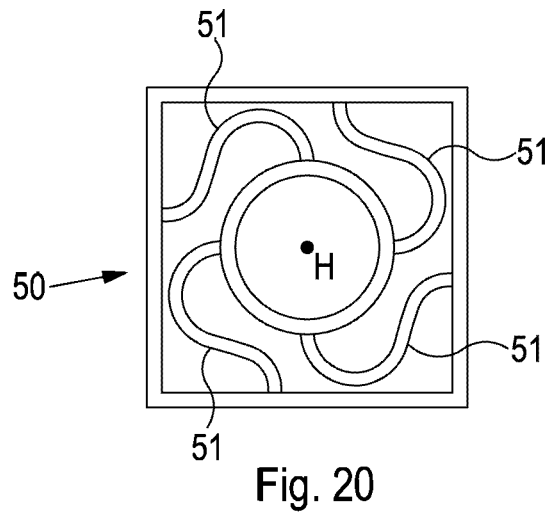
FIGS. 20 and 21 are plan views of the helical bearing arrangement of FIG. 19 with different forms of flexures.
Figure 21:
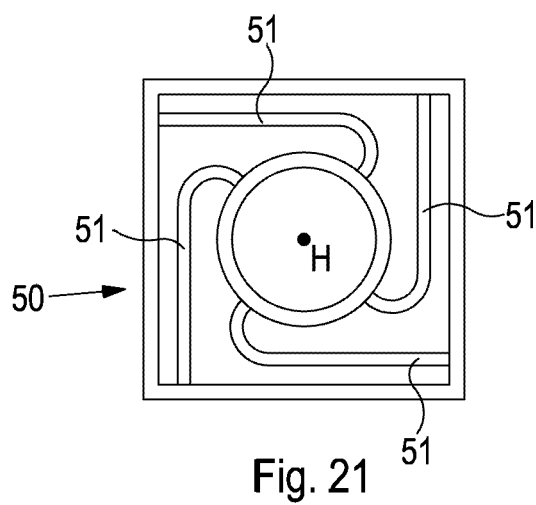

While the helical bearing arrangement 20 comprises helical bearings 30 that are rolling bearings in the above example, another possibility is that the helical bearing arrangement 20 comprises at least one flexure extending between the support structure 2 and the lens element 10 as shown for example in FIG. 19 wherein the helical bearing arrangement 20 comprises two flexure elements 50 that each comprise four flexures 51 having a configuration as shown either in FIG. 20 or in FIG. 21. As shown in FIG. 19, the flexures 51 are each pre-deflected along the helical axis H, and as shown in FIGS. 20 and 21, the flexures 51 each extend in an arc around the helical axis H. As a result of this configuration, the flexures 51 guide the helical movement of the lens element 10 with respect to the support structure 2 around the helical axis H. The specific number and arrangement of flexures 51 in FIGS. 19 to 21 is not essential and other configurations of flexures that are pre-deflected along the helical axis H and extend in an arc around the helical axis H may be used to provide the same function.

Figure 22:
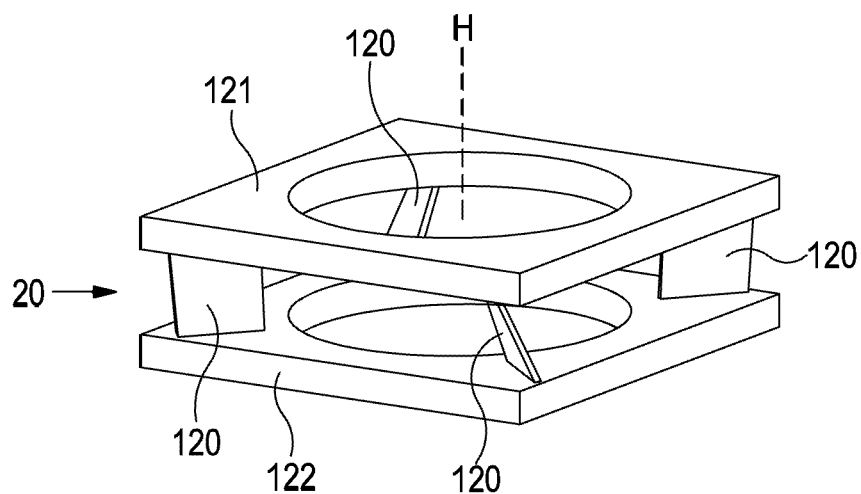
FIG. 22 is a perspective view of an alternative helical bearing arrangement comprising plural flexures.

FIG. 22 is a perspective view of an alternative helical bearing arrangement 20 comprising plural flexures 120, four flexures 120 being shown in FIG. 22 although in general any number of flexures 120 could be provided. In this example, the helical bearing arrangement also comprises a movable plate 121 mounted on lens element 10 and a support plate 122 mounted on the support structure 2. The movable plate 121 and the support plate 122 are spaced along the helical axis H and the flexures 120 extend along the helical axis H and are inclined with respect to a plane normal to the helical axis H helical axis with rotational symmetry around the helical axis H. With this arrangement, the flexures 120 guide the helical movement of the lens element 10 with respect to the support structure 2 around the helical axis H.

The flexures 120 are integrally formed with the movable plate 120 and the support plate 122. This form of connection is advantageous because it allows the helical bearing arrangement to be made as a single part, for example in a moulding, providing exact constraints. This solution therefore combines precision with a low manufacturing cost. That said, in principle the flexures 120 could be separate elements connected to the lens element 10 and the support structure 2 in any suitable way.

The use of SMA actuator wires to rotate the lens element 10 will now be described.

The actuation apparatus 1 includes at least one SMA actuator wire 60 for the purpose of rotating the lens element 10. The or each SMA actuator wire 60 is connected between the support structure 2 and the lens element 10, for example as shown in FIGS. 23 and 24. The SMA actuator wire 60 is connected to the support structure 2 and lens element 10 by crimp portions 61 which crimp the SMA actuator wire 60 to provide both mechanical and electrical connection. In the case of FIG. 23, the SMA actuator wire 60 extends in a plane normal to the helical axis H. In the case of FIG. 24, the SMA actuator wire 60 extends at an acute angle θ to a plane normal the helical axis H. The SMA actuator wire 60 is offset from the helical axis. Thus, in both the case FIG. 23 and FIG. 24, contraction of the SMA actuator wire 60 drives rotation of the lens element 10 around the helical axis H. Accordingly, either of the orientations of the SMA actuator wire 60 of FIG. 23 or FIG. 24 may be used in any of the arrangements described below.

As the helical bearing arrangement 20 guides helical movement of the lens element 10 with respect to the support structure 2 and constrains movement in other degrees of freedom, the rotation driven by contraction of the SMA actuator wire 60 is converted by the helical bearing arrangement 20 into helical movement of the lens element 10 with respect to the support structure 2. Thus, as well as the component of rotational movement, a component of translational movement of the lens element 10 with respect to the support structure 2 is achieved along the helical axis H. This changes the focus of the image on the image sensor 3 as described above.

As the SMA actuator wire 60 has the primary purpose of driving rotation of the lens element 10, the extent of the SMA actuator wire projected along the helical axis H may be minimised. As such, other components of the actuation apparatus 1 constrain the reduction in size along the helical axis H. Typically, the height projected along the helical axis H becomes dependent on the helical bearing arrangement 20, for example the helical bearing arrangement, which is illustrated schematically in FIGS. 23 and 24.

In the case of FIG. 23, as the SMA actuator wire 60 extends in a plane normal to the helical axis H, the SMA actuator wire 60 has a minimum extent projected along the helical axis H being essentially the thickness of the SMA actuator wire 60, which is clearly less than the extent $E_B$ of the helical bearing arrangement 20 projected along the helical axis H. However, the SMA actuator wire 60 is angled with respect to the flexures to allow the desired movement. Thus in FIG. 23 the flexures of the helical bearing arrangement need to be at an angle to the SMA actuator wire 60.

In the case of FIG. 24, as the SMA actuator wire 60 extends at an acute angle to a plane normal to the helical axis H, the SMA actuator wire 60 has a greater extent $E_S$ projected along the helical axis H than in the case of FIG. 23, but this extent $E_S$ may be controlled by adjusting the acute angle to fit within any desired size constraint, typically being selected to be less than the extent $E_B$ of the helical bearing arrangement 20 projected along the helical axis H.

Various different arrangements of the at least one SMA actuator wire 60 may be used in the actuation apparatus 1, provided that the at least one SMA actuator wire 60 drives rotation of the lens element 10 with respect to the support structure 2. Some examples of possible arrangements of the at least one SMA actuator wire 60 are as follows with reference to FIGS. 25 to 30 which are each schematic drawings of the actuation apparatus 1 including schematically illustrated connection portions 65 that are part of the lens element 10 and to which the SMA actuator wire 60 is connected. In each case, the or each SMA actuator wire 60 is connected between the support structure 2 and the lens element 10 in the respective orientations shown.

In a first type of embodiment, the actuation apparatus 1 further comprises a resilient biasing element 70 connected between the support structure 2 and the lens element 10, as in FIG. 25. The resilient biasing element 70 is typically a spring, as in the examples below, but in principle could be formed by any other element for example being a flexure or a piece of resilient material.

Such a resilient biasing element 70 is arranged to resiliently bias the at least one SMA actuator wire 60. In general terms, use of a resilient biasing element 70 with an SMA actuator wire is known, the resilient biasing element 70 applying a stress to the SMA actuator wire 60 and driving movement in the opposite direction from contraction of the SMA actuator wire 60. Thus, such a resilient biasing element 70 may be employed with a single SMA actuator wire 60 or plural SMA actuator wires 60. In the specific case of the SMA actuation 1, the resilient biasing element 70 may be arranged in various ways, some examples of which are as follows.

FIG. 25 shows an example where the actuation apparatus 1 comprises a single SMA actuator wire 60 only and the resilient biasing element 70 extends around the helical axis H and so provides a force around the helical axis H. In FIG. 25, the resilient biasing element operates in tension, but alternatively could operate in compression, for example being arranged alongside the SMA actuator wire 60. The use of a resilient biasing element 70 extends around the helical axis H minimises the extent of the resilient biasing element 70 projected along the helical axis H.

FIG. 26 shows an example where the actuation apparatus 1 comprises a single SMA actuator wire 60 only and the resilient biasing element 70 extends parallel to the helical axis H and so provides a force along the helical axis H. In this case, the forces applied by the resilient biasing element 70 acts in a different direction from the SMA actuator wire 60, but resilient biasing is still provided due to the effect of the helical bearing arrangement 20. In FIG. 26, a helical spring is the resilient biasing element 70, shown with its axis parallel to the optic axis. The spring axis could alternatively be at an angle to the optic axis, as depicted and described further below and in FIGS. 38, 39 and 40.

The examples shown in FIGS. 25 and 26 include a single SMA actuator wire 60, but may be modified to include plural SMA actuator wires 60 acting in parallel.

FIG. 27 shows an example of this which corresponds to the example of FIG. 25 but with the SMA actuator wire 60 and the resilient biasing element 70 being duplicated on opposite sides of the lens element 10. The SMA actuator wires 60 and the resilient biasing elements 70 have rotational symmetry around the helical axis, and so the SMA actuator wires 60 are complimentary and drive rotation of the lens element 10 with respect to the support structure 2 in parallel, that is in the same sense around the helical axis H, and so are actuated together. However, as the SMA actuator wires 60 are arranged on opposite sides of the helical axis H, the SMA actuator wires 60 also provide translational forces on the lens element 10 in opposite directions in a plane normal to the helical axis H (left and right in FIG. 27. Thus, the net translational force applied by the SMA actuator wires 60 is minimised, thereby reducing the force applied to the helical bearing arrangement 20.

In a second type of embodiment, no resilient biasing element is provided, and instead the actuation apparatus 1 comprises at least one pair of SMA actuator wires 60 that are arranged to drive rotation of the lens element 10 in opposite senses around the helical axis H. Similar to known uses of opposed SMA actuator wires to provide opposed forces in translation of an object that moves linearly, the or each pair of SMA actuator wires 60 apply opposed torques around the helical axis H. Thus, the SMA actuator wires 60 of the pair apply a stress to each other, which may act through the helical bearing arrangement 20, and drive rotation of the lens element 10 in the opposite directions around the helical axis H.

In the case of the SMA actuation 1, the at least one pair of SMA actuator wires 60 may be arranged in various ways, some examples of which are as follows.

FIG. 28 shows an example where the actuation apparatus 1 comprises a pair of SMA actuator wires 60 are arranged on opposite sides of the helical axis H. As a result, the pair of SMA actuator wires 60 apply lateral forces to the lens element 10 in a plane normal to the helical axis in parallel directions (that is from left to right in FIG. 28). In this case, the combined lateral force is resisted by the helical bearing arrangement 20. This is advantageous for the type of the helical bearing arrangement 20 that needs to be loaded, as may be the case when the helical bearings 30 are used, as in the example in FIG. 4.

FIG. 29 shows an example where the actuation apparatus 1 comprises a pair of SMA actuator wires 60 are arranged on the same side of the helical axis H. Although FIG. 29 shows the SMA actuator wires 60 as being alongside each other as viewed along the helical axis H, the SMA actuator wires 60 may alternatively overlie each other to reduce the footprint of the actuation apparatus 1. As a result, the SMA actuator wires 60 apply lateral forces to the lens element 10 in a plane normal to the helical axis H in opposite directions (that is, in FIG. 29, one SMA actuator wire 60 applying a force from left to right and the other SMA actuator wire 60 applying a force from right to left). Thus, the net translational force applied by the SMA actuator wires 60 to the helical bearing arrangement 20 is minimised, thereby reducing the force applied to the helical bearing arrangement 20. This may be advantageous for types of helical bearing arrangement 20 where loading is disadvantageous, as may be the case when flexures 51 are used, as in the example in FIG. 19.

FIG. 30 shows an example where the actuation apparatus 1 comprises a pair of SMA actuator wires 60 on two adjacent sides of the lens element 10 and having an angle therebetween of 90 degrees. More generally the orientation of the SMA actuator wires 60 may be changed so that the angle therebetween has any size less than 180 degrees, but preferably the angle is in the range from 70 to 110 degrees as viewed along the helical axis H. In this case, the net translational force applied by the SMA actuator wires 60 to the helical bearing arrangement 20 is reduced compared to the example of FIG. 28. The reduction is by a factor of √2 in the example of FIG. 30 but this factor may be controlled by selection of the angle between the SMA actuator wires. This type of configuration is useful for controlling the loading applied to the helical bearing arrangement 20. This is advantageous for type of the helical bearing arrangement 20 that need to be loaded, as may be the case when the helical bearings 30 are used, as in the example in FIG. 45.

In general terms, any of the forms of the helical bearing arrangement 20 described herein, including any helical bearing arrangement or the flexure arrangement, may be used with any of the arrangements of at least one SMA actuator wire 60 described herein.

In all of the examples above, the SMA actuator wires 60 are driven by the control circuit implemented in the IC chip 5. In particular, the control circuit generates drive signals for each of the SMA actuator wires 60 and supplies the drive signals to the SMA actuator wires 60. The control circuit receives an input signal representing a desired position for the lens element 10 along the optical axis O and generates drive signals selected to drive the lens element 10 to the desired position. The drive signals may be generated using a resistance feedback control technique, in which case the control circuit 20 measures the resistance of the lengths of SMA actuator wire 20 and uses the measured resistance as a feedback signal to control the power of the drive signals. Such a resistance feedback control technique may be implemented as disclosed in any of WO-2013/175197; WO-2014/076463; WO-2012/066285; WO-2012/020212; WO-2011/104518; WO-2012/038703; WO-2010/089529 or WO-2010029316, each of which is incorporated herein by reference. As an alternative, the control circuit may include a sensor which senses the position of the lens element 10, for example a Hall sensor which sense the position of a magnet fixed to the lens element 10. In this case, the drive signals use the sensed position as a feedback signal to control the power of the drive signals.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

For instance, the actuation apparatus 1 may comprise a non-SMA actuator, e.g. a voice coil motor (VCM). This may be arranged in any suitable way, for example as described in PCT/GB2019/053260 which is incorporated herein by this reference.

The invention claimed is:

1. An actuation apparatus comprising:
   a support structure;
   a movable element;
   a helical bearing arrangement supporting the movable element on the support structure and arranged to guide helical movement of the movable element with respect to the support structure along a helical path around a helical axis;
   an actuating mechanism configured to drive rotation of the movable element around the helical axis which the helical bearing arrangement converts into said helical movement; and
   a resilient loading arrangement comprising a resilient element connected between the movable element and the support structure, the resilient element configured to exert a biasing force on the movable element in a direction that is at least substantially normal to the helical path over an operating range of the helical movement;
   wherein the actuating mechanism comprises at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

2. The actuation apparatus according to claim 1, wherein the resilient element comprises a flexure that is preloaded so as to provide the biasing force, wherein the flexure is formed from sheet material.

3. The actuation apparatus according to claim 2, wherein the preloading is achieved by deforming the flexure during assembly of the actuation apparatus, wherein the flexure is preformed prior to the assembly, and wherein the flexure is deformed by being attached to the movable element and/or to the support structure or by contact with a clamp attached to the movable element and/or to the support structure.

4. The actuation apparatus of claim 2, wherein the flexure is elongate and extends along a tortuous path that is substantially orthogonal to the helical axis or wherein the flexure is elongate and extends along a path that is substantially orthogonal to the helical axis and passes at least partway, optionally at least halfway, around the helical axis.

5. The actuation apparatus of claim 1, wherein the resilient element comprises elastic material, and
   wherein:
      the resilient element comprises an elastic member fixed at one end thereof to the movable element and at the other end thereof to the support structure; or
      the elastic material is located between a surface of the movable element and a surface of the support structure.

6. An actuation apparatus comprising:
   a support structure;
   a movable element;
   a helical bearing arrangement supporting the movable element on the support structure and arranged to guide helical movement of the movable element with respect to the support structure along a helical path around a helical axis;

an actuating mechanism configured to drive rotation of the movable element around the helical axis which the helical bearing arrangement converts into said helical movement; and a resilient loading arrangement configured to exert a biasing force on the movable element in a direction that is at least substantially normal to the helical path over an operating range of the helical movement, wherein the resilient loading arrangement comprises a resilient element with a first end attached to one of the movable element and the support structure and a second end to which a bearing element is attached to exert a force on the other one of the movable element and the support structure; and wherein the actuating mechanism comprises at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

7. An actuation apparatus comprising: a support structure; a movable element;

a helical bearing arrangement supporting the movable element on the support structure and arranged to guide helical movement of the movable element with respect to the support structure along a helical path around a helical axis;

an actuating mechanism configured to drive rotation of the movable element around the helical axis which the helical bearing arrangement converts into said helical movement; and a resilient loading arrangement configured to exert a biasing force on the movable element in a direction that is at least substantially normal to the helical path over an operating range of the helical movement, wherein the helical bearing arrangement comprises three sets of bearings and the three sets of bearings and the resilient loading arrangement are at least substantially equally spaced around the helical axis; and wherein the actuating mechanism comprises at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

8. The actuation apparatus according to claim 7, wherein the at least one shape memory alloy actuator wire is arranged, on contraction, to drive rotation of the movable element around the helical axis by less than one quarter of a full turn.

9. An actuation apparatus comprising: a support structure; a movable element;

a helical bearing arrangement supporting the movable element on the support structure and arranged to guide helical movement of the movable element with respect to the support structure along a helical path around a helical axis;

an actuating mechanism configured to drive rotation of the movable element around the helical axis which the helical bearing arrangement converts into said helical movement; and a magnetic loading arrangement configured to exert a biasing force on the movable element in a direction that is at least substantially normal to the helical path over an operating range of the helical movement;

wherein the actuating mechanism comprises at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

10. The actuation apparatus of claim 9, wherein the magnetic loading arrangement comprises a first magnetic element mounted to the movable element and a second magnetic element mounted to the support structure, wherein the first and second magnetic elements comprise surfaces that face each other, and wherein the surfaces of the first and second magnetic elements that face each other are arranged parallel to the helical movement path.

11. The actuation apparatus of claim 10, wherein the surfaces of the first and second magnetic elements that face each other are separated by a gap, wherein the extent of the gap between the surfaces remains substantially constant over the operating range of the helical movement.

12. The actuation apparatus of claim 10, wherein one of the first or second magnetic elements comprises a magnet and the other of the first and second magnetic element comprises a ferrous material.

13. The actuation apparatus of claim 10, wherein the extent one of the surfaces of the first and second magnetic elements that are facing each other is greater than the extent of the other of the surfaces of the first and second magnetic elements that are facing each other.

14. The actuation apparatus according to claim 9, wherein the biasing force is exerted when the actuating mechanism is not energised.

15. The actuation apparatus according to claim 9, wherein the movable element is a lens element comprising at least one lens, and wherein the helical axis is the optical axis of the lens element, and wherein the support structure has an image sensor mounted thereon, the lens element being arranged to focus an image on the image sensor.

16. The actuation apparatus according to claim 9, wherein the actuating mechanism is configured to apply, upon activation, a driving force for driving relative rotation between the movable element and the support structure, wherein such driving force is sufficient to overcome the biasing force.

17. The actuation apparatus according to claim 6, wherein the biasing force exerted by the resilient element is insufficient to cause relative rotation between the movable element and the support structure.

18. The actuation apparatus according to claim 1, wherein the at least one shape memory alloy actuator wire is arranged, on contraction, to drive rotation of the movable element around the helical axis by less than one quarter of a full turn.

19. The actuation apparatus according to claim 9, wherein the at least one shape memory alloy actuator wire is arranged, on contraction, to drive rotation of the movable element around the helical axis by less than one quarter of a full turn.

20. The actuation apparatus according to claim 6, wherein the at least one shape memory alloy actuator wire is arranged, on contraction, to drive rotation of the movable element around the helical axis by less than one quarter of a full turn.

21. The actuation apparatus according to claim 1, wherein the movable element is a lens element comprising at least one lens, and wherein the helical axis is the optical axis of the lens element, and wherein the support structure has an image sensor mounted thereon, the lens element being arranged to focus an image on the image sensor.

* * * * *